US009141200B2

(12) United States Patent
Bernstein et al.

(10) Patent No.: US 9,141,200 B2
(45) Date of Patent: Sep. 22, 2015

(54) DEVICE, METHOD, AND GRAPHICAL USER INTERFACE FOR ENTERING CHARACTERS

(71) Applicant: Apple Inc., Cupertino, CA (US)

(72) Inventors: Jeffrey Traer Bernstein, San Francisco, CA (US); Julian K. Missig, Redwood City, CA (US); Nicholas Zambetti, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 13/681,367

(22) Filed: Nov. 19, 2012

(65) Prior Publication Data

US 2014/0035824 A1 Feb. 6, 2014

Related U.S. Application Data

(60) Provisional application No. 61/678,516, filed on Aug. 1, 2012.

(51) Int. Cl.
*G06F 3/0488* (2013.01)
*G06F 3/02* (2006.01)

(52) U.S. Cl.
CPC ............... *G06F 3/02* (2013.01); *G06F 3/0213* (2013.01); *G06F 3/04883* (2013.01); *G06F 3/04886* (2013.01)

(58) Field of Classification Search
CPC ............ G06F 3/04883; G06F 1/1662–1/1671; G06F 3/021
See application file for complete search history.

(56) References Cited

U.S. PATENT DOCUMENTS

| 7,257,528 | B1* | 8/2007 | Ritchie et al. ...................... 704/7 |
| 2002/0033285 | A1* | 3/2002 | Afanasiev .................. 178/18.01 |
| 2005/0122322 | A1* | 6/2005 | Furuya et al. ................. 345/418 |
| 2006/0114238 | A1* | 6/2006 | Wong et al. ................... 345/173 |
| 2009/0225041 | A1* | 9/2009 | Kida et al. ..................... 345/173 |
| 2009/0226091 | A1* | 9/2009 | Goldsmith et al. ............ 382/189 |
| 2012/0056814 | A1* | 3/2012 | Sudo ............................. 345/168 |
| 2012/0117506 | A1* | 5/2012 | Koch et al. .................... 715/773 |

* cited by examiner

*Primary Examiner* — Gerald Johnson
*Assistant Examiner* — Christopher Kohlman
(74) *Attorney, Agent, or Firm* — Morrison & Foerster LLP

(57) ABSTRACT

A device with a display and a touch-sensitive keyboard with one or more character keys: displays a text entry area; detects a first input on the touch-sensitive keyboard; in accordance with a determination that the first input corresponds to activation of a character key, enters a first character corresponding to the character key into the text entry area; in accordance with a determination that the first input corresponds to a character drawn on the touch-sensitive keyboard: determines one or more candidate characters for the drawn character, and displays a candidate character selection interface that includes at least one of the candidate characters; while displaying the candidate character selection interface, detects a second input that selects a respective candidate character within the candidate character selection interface; and in response to detecting the second input, enters the selected respective candidate character into the text entry area.

9 Claims, 28 Drawing Sheets

US 9,141,200 B2

DEVICE, METHOD, AND GRAPHICAL USER INTERFACE FOR ENTERING CHARACTERS

RELATED APPLICATION

This application claims priority to U.S. Provisional Application Ser. No. 61/678,516, filed Aug. 1, 2012, which is incorporated herein by reference in its entirety.

TECHNICAL FIELD

This relates generally to electronic devices with touch-sensitive surfaces, including but not limited to electronic devices that receive text input on a touch-sensitive keyboard.

BACKGROUND

Electronic devices typically need to enter many different types of characters. For example, devices may need to input Asian syllabic or logographic characters. A user may need to perform such character entry in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

But existing methods for entering syllabic or logographic characters are cumbersome and inefficient. For example, when the user uses a touch pad separate from the keyboard to draw a character, the user must move his hand back and forth between the keyboard and the touch pad. This going back and forth is tedious and creates a significant cognitive burden for the user. In addition, existing methods take longer than necessary, thereby wasting energy. This latter consideration is particularly important in battery operated devices.

SUMMARY

Accordingly, there is a need for electronic devices with faster, more efficient methods and interfaces for entering characters. Such methods and interfaces may complement or replace conventional methods for entering characters. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices are reduced or eliminated by the disclosed devices with touch-sensitive keyboards. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on a touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive keyboard. The method includes: displaying a text entry area on the display; detecting a first input on the touch-sensitive keyboard, the touch-sensitive keyboard including one or more character keys; in accordance with a determination that the first input corresponds to activation of a character key on the touch-sensitive keyboard, entering a first character corresponding to the character key into the text entry area; in accordance with a determination that the first input corresponds to a character drawn on the touch-sensitive keyboard: determining one or more candidate characters for the drawn character, and displaying a candidate character selection interface on the display, including displaying at least one of the candidate characters in the candidate character selection interface; while displaying the candidate character selection interface on the display, detecting a second input that selects a respective candidate character within the candidate character selection interface; and in response to detecting the second input, entering the selected respective candidate character into the text entry area.

In accordance with some embodiments, an electronic device includes a display, a touch-sensitive keyboard, one or more processors, memory, and one or more programs. The one or more programs are stored in the memory and configured to be executed by the one or more processors. The one or more programs include instructions for: displaying a text entry area on the display; detecting a first input on the touch-sensitive keyboard, the touch-sensitive keyboard including one or more character keys; in accordance with a determination that the first input corresponds to activation of a character key on the touch-sensitive keyboard, entering a first character corresponding to the character key into the text entry area; in accordance with a determination that the first input corresponds to a character drawn on the touch-sensitive keyboard: determining one or more candidate characters for the drawn character, and displaying a candidate character selection interface on the display, including displaying at least one of the candidate characters in the candidate character selection interface; while displaying the candidate character selection interface on the display, detecting a second input that selects a respective candidate character within the candidate character selection interface; and in response to detecting the second input, entering the selected respective candidate character into the text entry area.

In accordance with some embodiments, a computer readable storage medium has stored therein instructions which when executed by an electronic device with a display and a touch-sensitive keyboard, cause the device to: display a text entry area on the display; detect a first input on the touch-sensitive keyboard, the touch-sensitive keyboard including one or more character keys; in accordance with a determination that the first input corresponds to activation of a character key on the touch-sensitive keyboard, enter a first character corresponding to the character key into the text entry area; in accordance with a determination that the first input corresponds to a character drawn on the touch-sensitive keyboard: determine one or more candidate characters for the drawn character, and display a candidate character selection interface on the display, including displaying at least one of the candidate characters in the candidate character selection interface; while displaying the candidate character selection interface on the display, detect a second input that selects a respective candidate character within the candidate character selection interface; and in response to detecting the second input, enter the selected respective candidate character into the text entry area.

In accordance with some embodiments, a graphical user interface on an electronic device with a display, a touch-sensitive keyboard, a memory, and one or more processors to execute one or more programs stored in the memory includes a text entry area, wherein: in accordance with a determination that a first input detected on the touch-sensitive keyboard corresponds to activation of a character key on the touch-sensitive keyboard, a first character corresponding to the character key is entered into the text entry area; in accordance with a determination that the first input corresponds to a character drawn on the touch-sensitive keyboard: one or more candidate characters for the drawn character are determined, and a candidate character selection interface is displayed on the display, including displaying at least one of the candidate characters in the candidate character selection interface; and in response to detecting, while displaying the candidate character selection interface on the display, a second input that selects a respective candidate character within the candidate character selection interface, the selected respective candidate character is entered into the text entry area.

In accordance with some embodiments, an electronic device includes: a display; a touch-sensitive keyboard; means for displaying a text entry area on the display; means for detecting a first input on the touch-sensitive keyboard, the touch-sensitive keyboard including one or more character keys; means, in accordance with a determination that the first input corresponds to activation of a character key on the touch-sensitive keyboard, for entering a first character corresponding to the character key into the text entry area; means, in accordance with a determination that the first input corresponds to a character drawn on the touch-sensitive keyboard, for: determining one or more candidate characters for the drawn character, and displaying a candidate character selection interface on the display, including displaying at least one of the candidate characters in the candidate character selection interface; means for, while displaying the candidate character selection interface on the display, detecting a second input that selects a respective candidate character within the candidate character selection interface; and means, responsive to detecting the second input, for entering the selected respective candidate character into the text entry area.

In accordance with some embodiments, an information processing apparatus for use in an electronic device with a display and a touch-sensitive keyboard includes: means for displaying a text entry area on the display; means for detecting a first input on the touch-sensitive keyboard, the touch-sensitive keyboard including one or more character keys; means, in accordance with a determination that the first input corresponds to activation of a character key on the touch-sensitive keyboard, for entering a first character corresponding to the character key into the text entry area; means, in accordance with a determination that the first input corresponds to a character drawn on the touch-sensitive keyboard, for: determining one or more candidate characters for the drawn character, and displaying a candidate character selection interface on the display, including displaying at least one of the candidate characters in the candidate character selection interface; means for, while displaying the candidate character selection interface on the display, detecting a second input that selects a respective candidate character within the candidate character selection interface; and means, responsive to detecting the second input, for entering the selected respective candidate character into the text entry area.

In accordance with some embodiments, an electronic device includes a display unit configured to display a text entry area, a touch-sensitive keyboard unit configured to receive inputs, and a processing unit coupled to the display unit and the touch-sensitive keyboard unit. The processing unit is configured to: detect a first input on the touch-sensitive keyboard unit, the touch-sensitive keyboard unit including one or more character keys; in accordance with a determination that the first input corresponds to activation of a character key on the touch-sensitive keyboard unit, entering a first character corresponding to the character key into the text entry area; in accordance with a determination that the first input corresponds to a character drawn on the touch-sensitive keyboard unit: determine one or more candidate characters for the drawn character; and enable display of a candidate character selection interface on the display unit, including displaying at least one of the candidate characters in the candidate character selection interface; while displaying the candidate character selection interface on the display unit, detect a second input that selects a respective candidate character within the candidate character selection interface; and in response to detecting the second input, enter the selected respective candidate character into the text entry area.

Thus, electronic devices with displays and touch-sensitive keyboards are provided with faster, more efficient methods and interfaces for entering characters, thereby increasing the effectiveness, efficiency, and user satisfaction with such devices. Such methods and interfaces may complement or replace conventional methods for entering characters.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
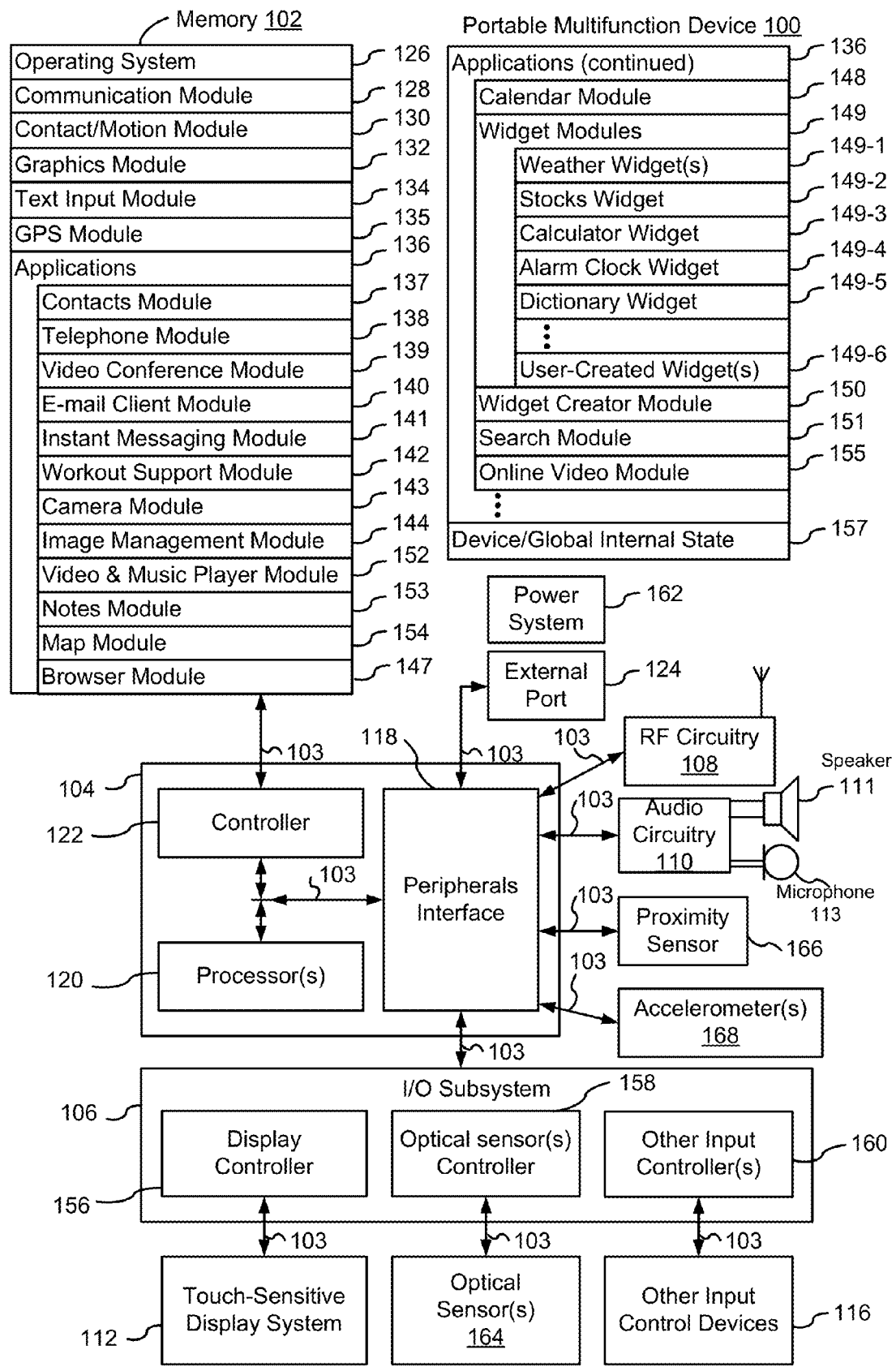
FIG. 1A is a block diagram illustrating a portable multifunction device with a touch-sensitive display in accordance with some embodiments.

Some electronic devices include a capability to enter characters of foreign languages by drawing them, as opposed to typing them. In existing methods, the characters are drawn on a touch-sensitive surface separate from the keyboard, such as a touchpad, and candidate characters that best match the drawn character are identified for the user's selection. However, with the touch-sensitive surface being separate from the keyboard, when the user wants to draw a character, the user needs to move at least one hand from the keyboard to the touch-sensitive surface to draw the character. These hand and arm movements impose a physical and cognitive burden on the user. The embodiments below describe a new way to enter characters using a touch-sensitive keyboard. The user may activate keys on the touch-sensitive keyboard to enter letters corresponding to the activated keys or draw characters on the touch-sensitive keyboard to enter more complex characters. Because the user can draw the characters on the touch-sensitive keyboard, hand and arm movements to and from the keyboard and a separate touch-sensitive surface are reduced or eliminated.

Below, FIGS. 1A-1B, 2, and 3 provide a description of exemplary devices. FIGS. 4A-4B and 5A-5R illustrate exemplary user interfaces for entering characters. FIGS. 6A-6C are flow diagrams illustrating a method of entering characters using a touch-sensitive keyboard. The user interfaces in FIGS. 5A-5R are used to illustrate the processes in FIGS. 6A-6C.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch-sensitive keyboard, a touch screen display, and/or a touch pad).

In the discussion that follows, an electronic device that includes a display and a touch-sensitive surface is described. It should be understood, however, that the electronic device may include one or more other physical user-interface devices, such as a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164.

These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
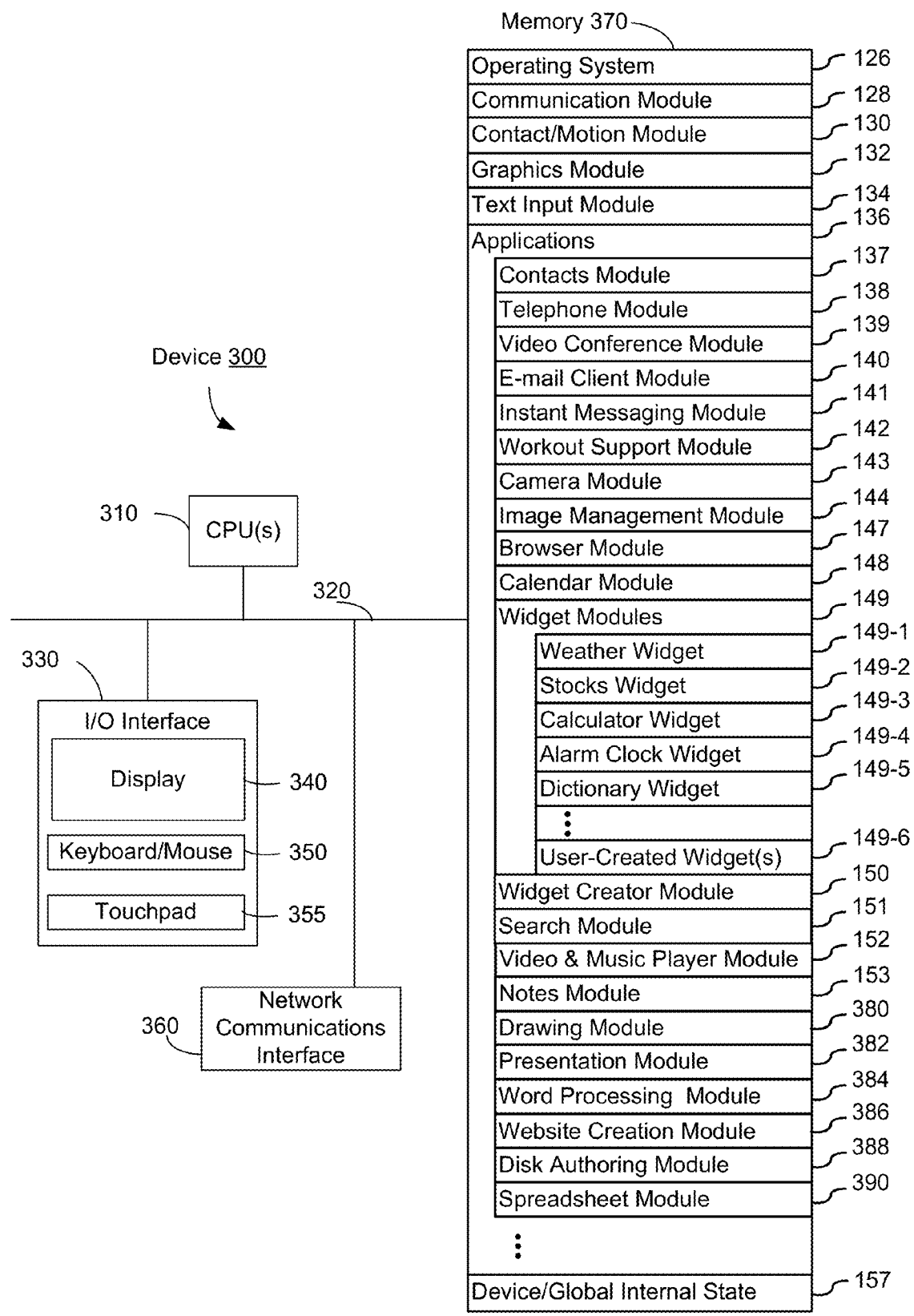
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
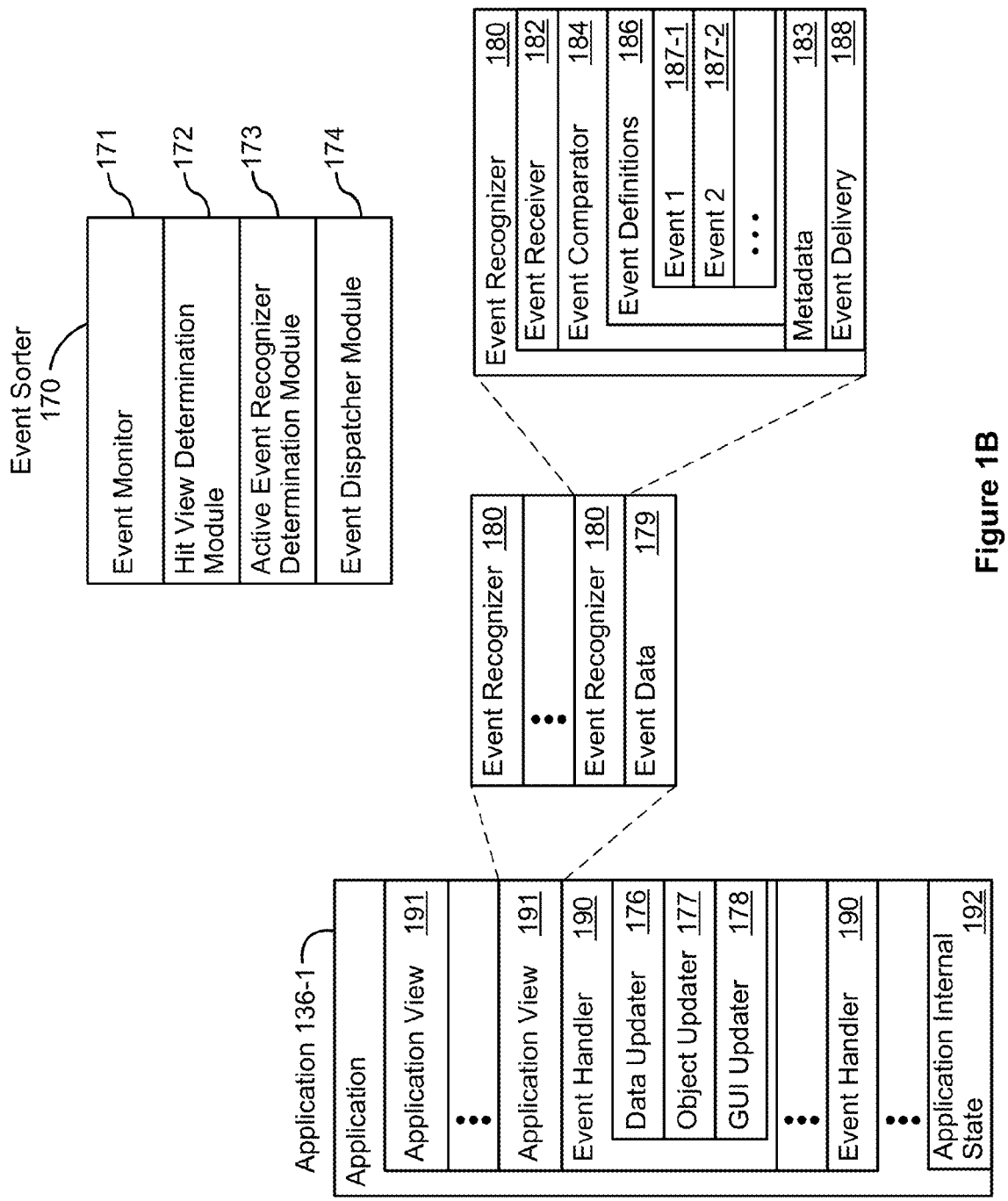
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
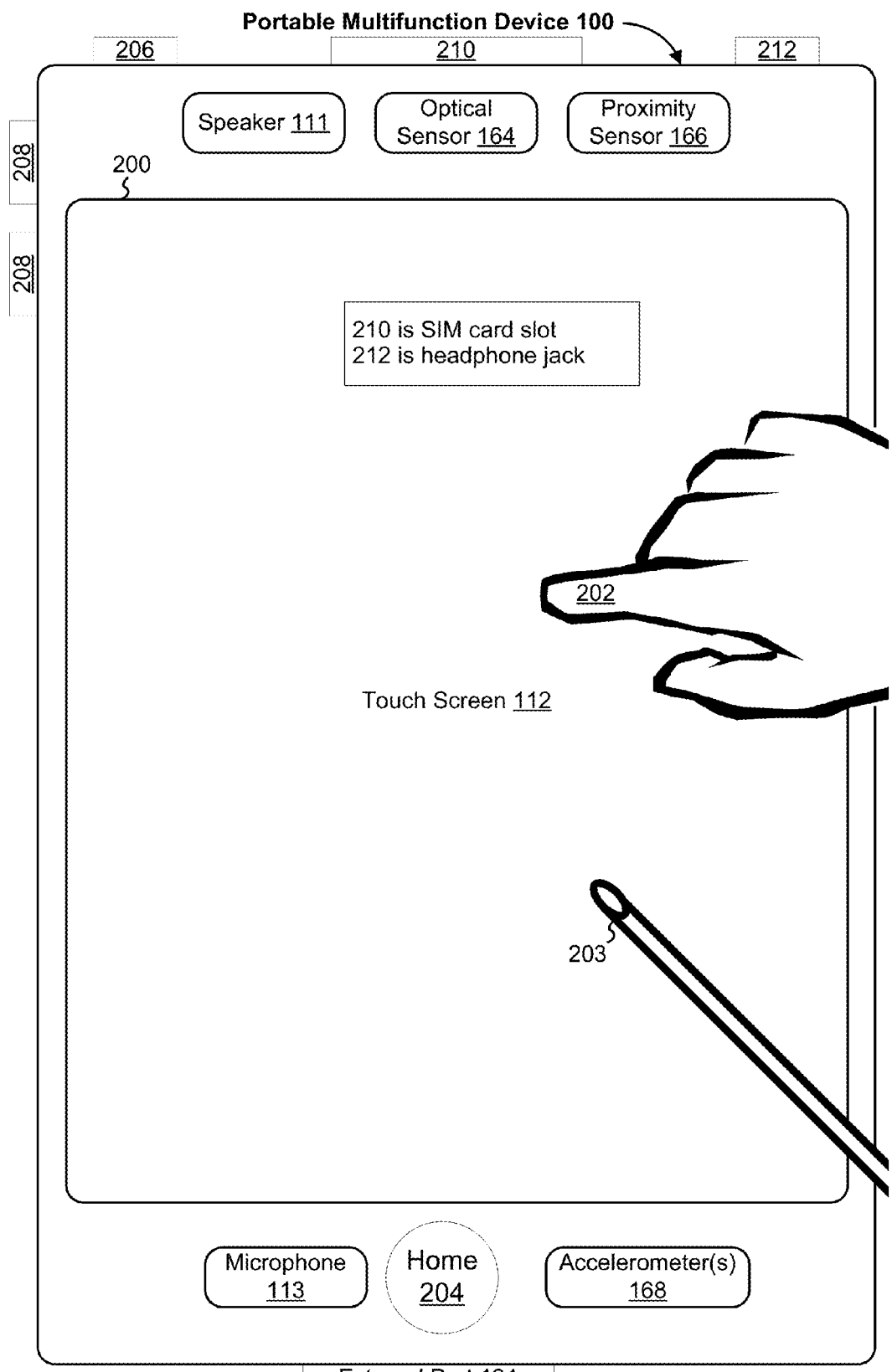
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which may be a touch screen display. I/O interface 330 also may include a keyboard and/or mouse (or other pointing device) 350 and touchpad 355. In some embodiments, keyboard 350 is touch sensitive. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
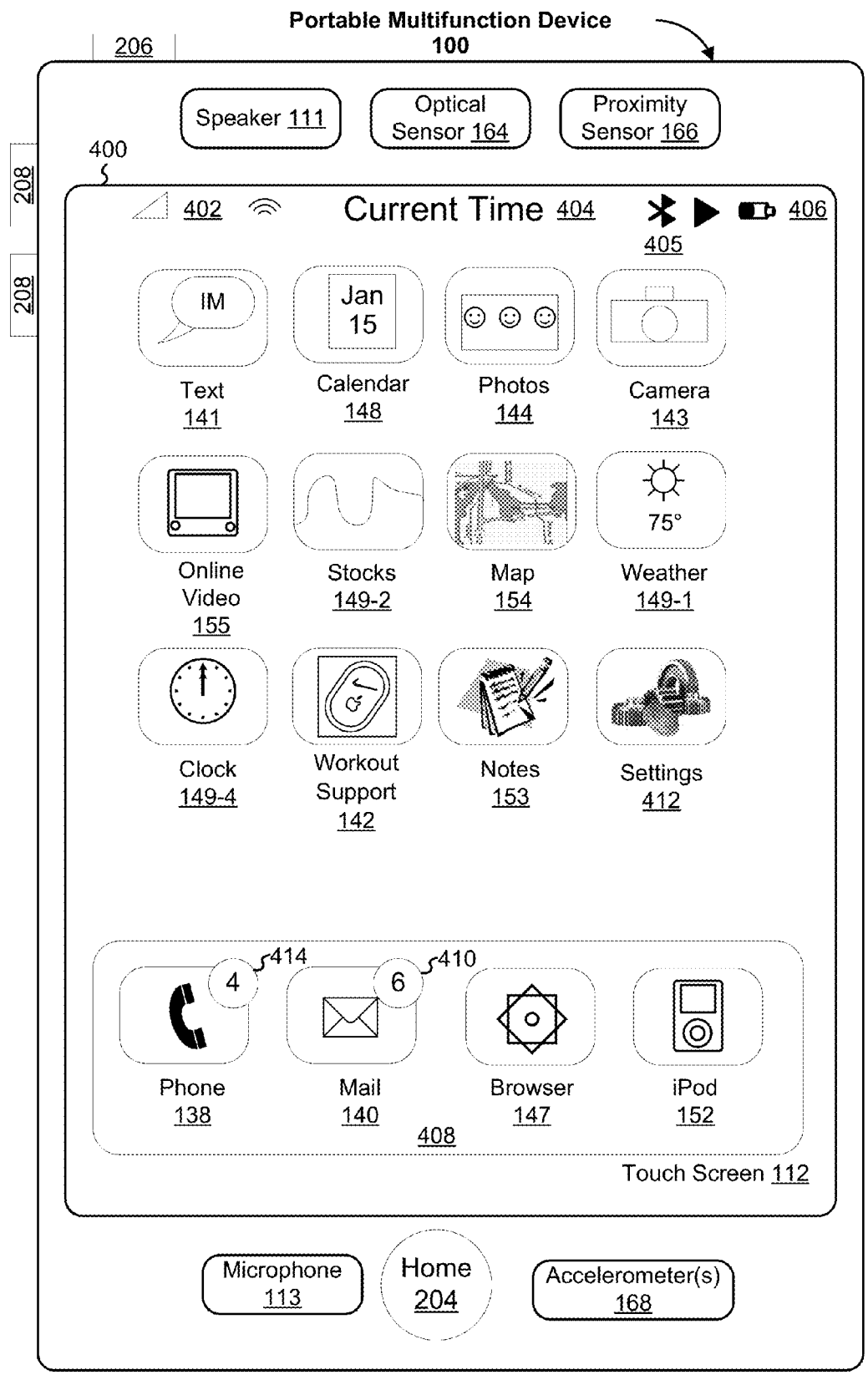
FIG. 4A illustrates an exemplary user interface for a menu of applications on a portable multifunction device in accordance with some embodiments.
Figure 5A:
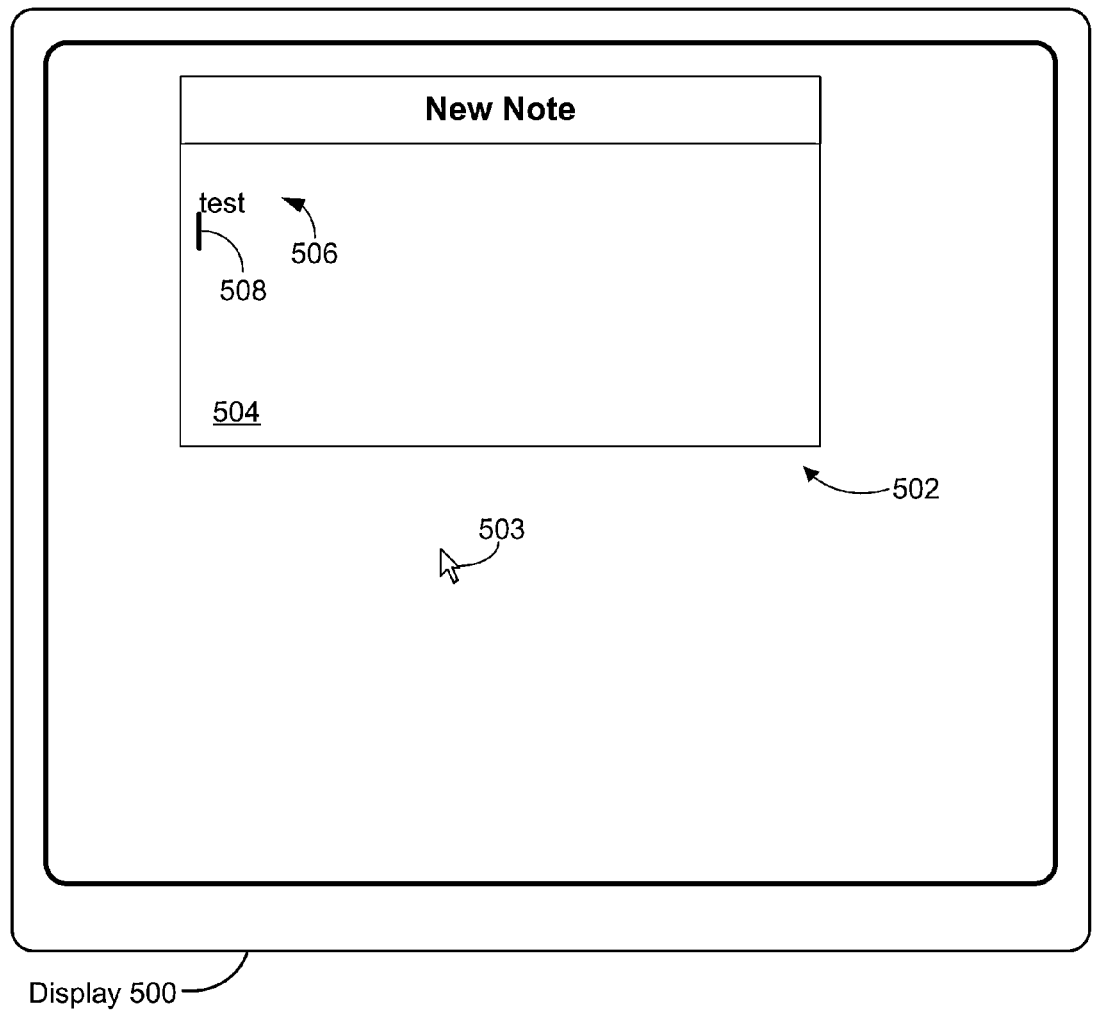
FIGS. 5A-5R illustrate exemplary user interfaces for entering characters using a touch-sensitive keyboard in accordance with some embodiments.
Figure 5A:
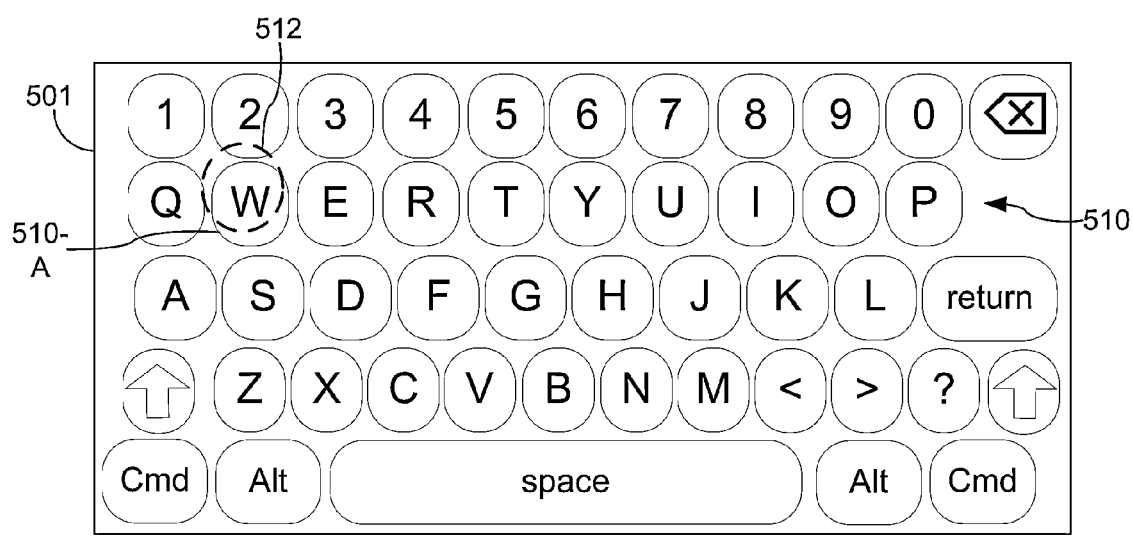

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;
  Settings 412, which provides access to settings for device 100 and its various applications 136; and
  Online video module 155, also referred to as YouTube (trademark of Google Inc.) module 155.

Figure 4B:
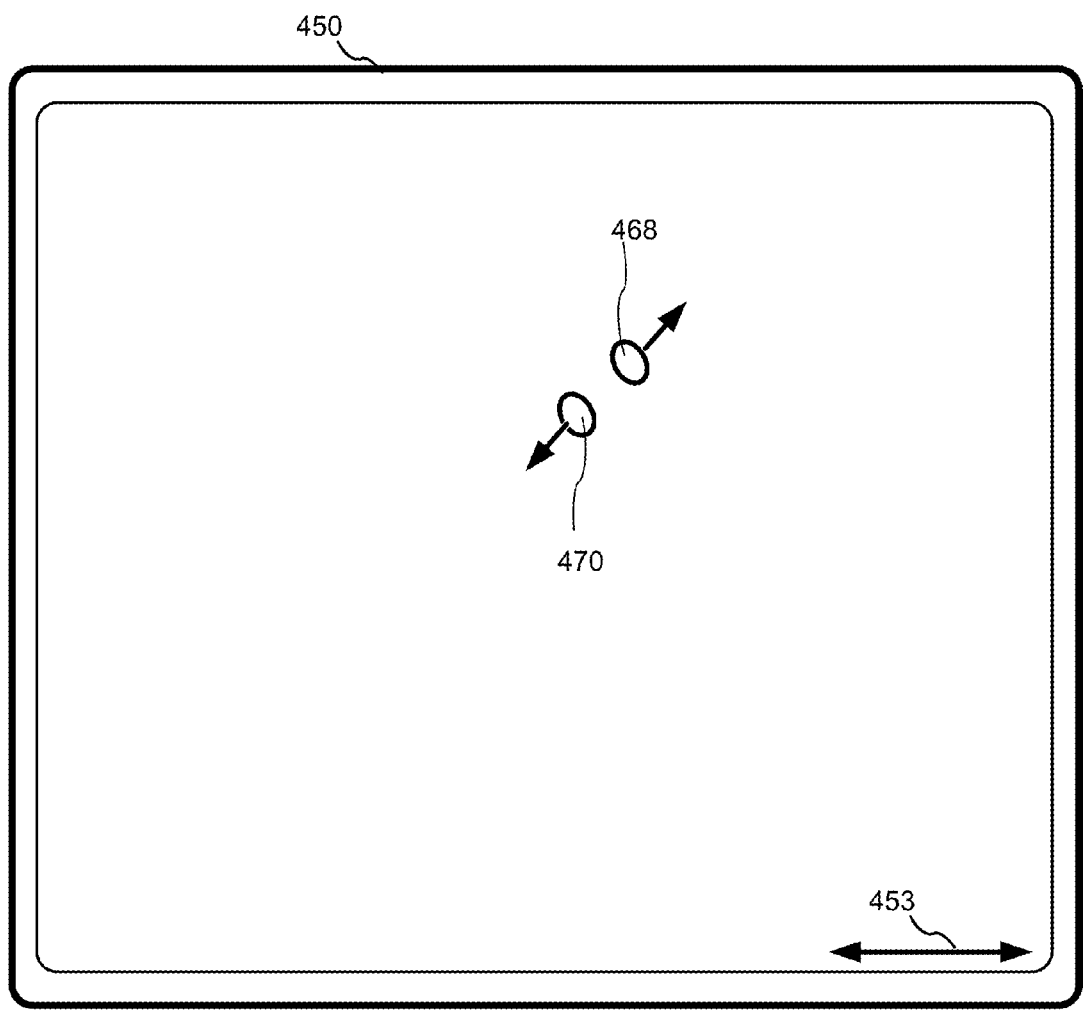
FIG. 4B illustrates an exemplary user interface for a multifunction device with a touch-sensitive surface that is separate from the display in accordance with some embodiments.
Figure 4B:
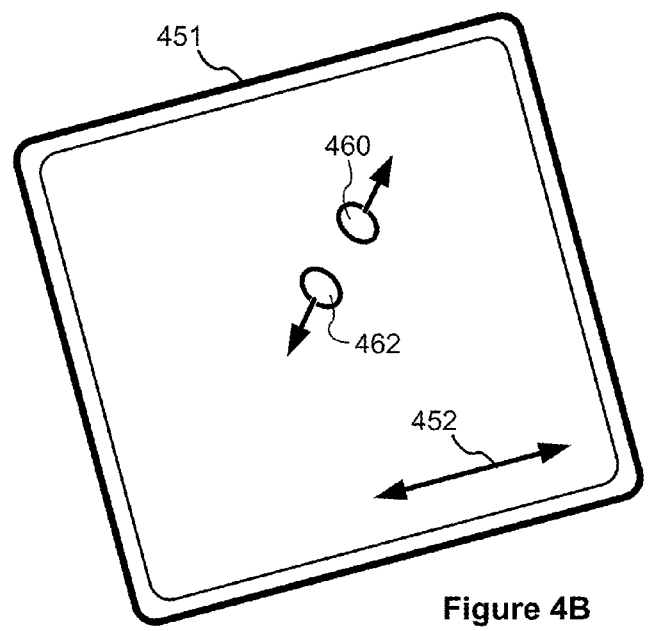

FIG. 4B illustrates an exemplary user interface on a device (e.g., device 300, FIG. 3) with a touch-sensitive surface 451 (e.g., a tablet, a touch-sensitive keyboard 350, and/or touchpad 355, FIG. 3) that is separate from the display 450 (e.g., touch screen display 112). Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures, finger strokes on keyboard keys), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

User Interfaces and Associated Processes

Attention is now directed towards embodiments of user interfaces ("UI") and associated processes that may be implemented on an electronic device with a display and a touch-sensitive keyboard, such as device 300 or portable multifunction device 100.

FIGS. 5A-5R illustrate exemplary user interfaces for entering characters in accordance with some embodiments. The user interfaces in these figures are used to illustrate the processes described below, including the processes in FIGS. 6A-6C.

FIG. 5A illustrates application window 502 displayed on display 500 (e.g., touch screen 112, display 340, or display 450) of a device (e.g., device 300 or 100). One or more application windows 502 may be displayed on display 500. Application window 502 corresponds to an application that includes text input capability. For example, application window 502 as shown in FIG. 5A corresponds to a notes application. In some embodiments, pointer 503 is also displayed on display 500. A user may manipulate pointer 503 to perform various functions, such as opening and moving application windows 502.

Application window 502 includes text input area 504. A user may input text 506, and the input text is displayed in text input area 504. Text cursor 508 may also be displayed in text input area 504. Text cursor 508 marks a position at which text input is to be inserted.

Text 506 input by a user may be displayed in text input area 504. For example, in FIG. 5A, text 506 includes the sequence of letters "test." Text 506 may be input by a user using touch-sensitive keyboard 501. Keyboard 501 includes character keys, such as letter keys 510, number keys, and keys for other characters (e.g., symbols. punctuation, whitespace). Keyboard 501 also may include functional keys (e.g., "Alt," "Control," "Command"). Keyboard 501 as shown in FIG. 5A is a keyboard that includes Latin alphabet letter keys. In some other embodiments, keyboard 501 may have keys corresponding to letters of other alphabets, such as Cyrillic or Greek.

In some embodiments, touch-sensitive keyboard 501 is a physical keyboard that is touch sensitive. In some other embodiments, keyboard 501 is a virtual keyboard (also called a "soft keyboard") that is displayed on display 500, where display 500 is a touch-sensitive display (e.g., touch screen 112, FIG. 1A).

Figure 5B:
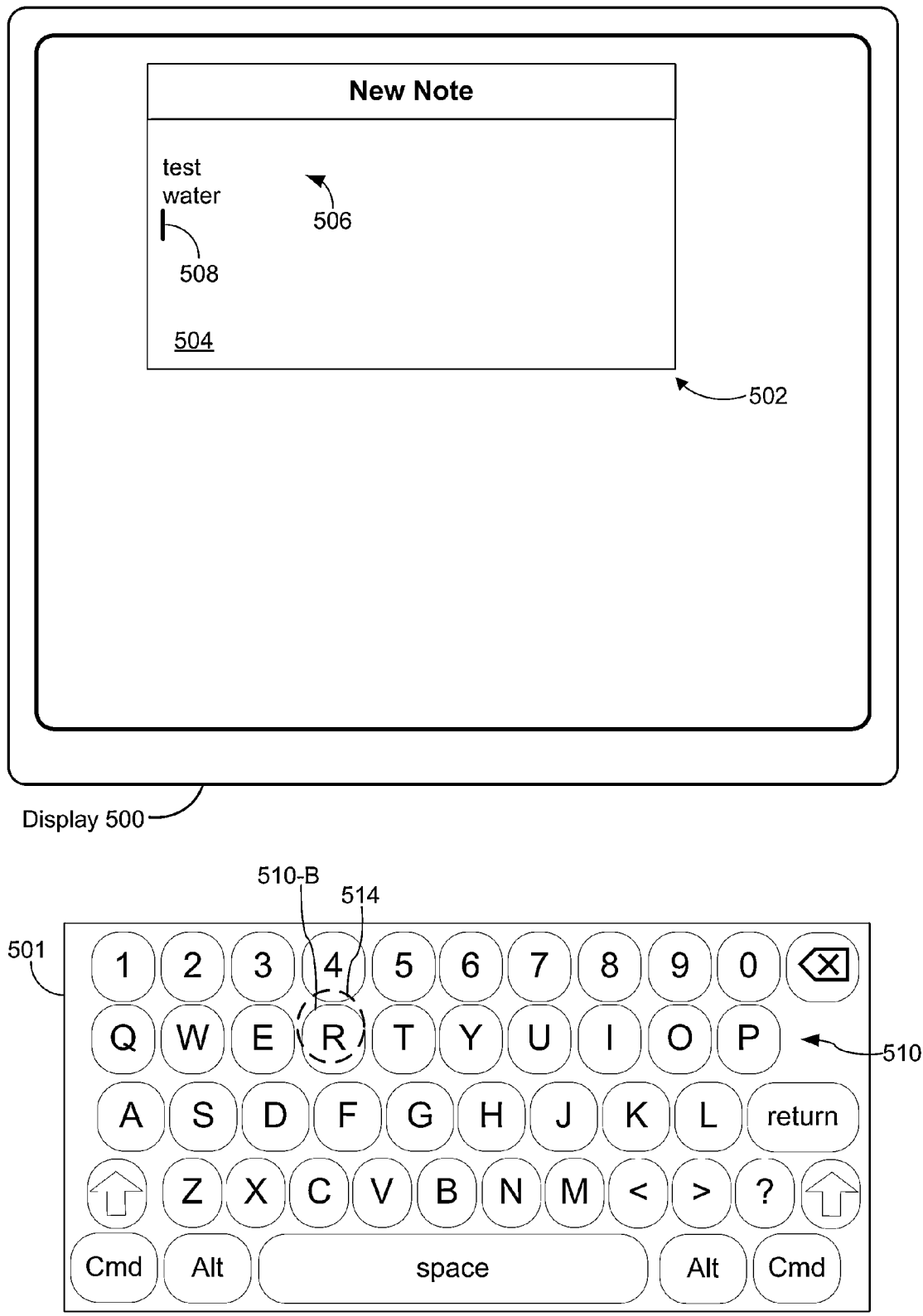

FIG. 5A shows keystroke 512 on "W" key 510-A, which activates "W" key 510-A. In response to the activation of "W" key 510-A, the letter "w" is entered into text 506, as shown in FIG. 5B. Additional letters "ater" are entered into text 506 by respective keystrokes (not shown) activating the "A," "T," and "E" keys on keyboard 501, and keystroke 514 activating "R" key 510-B. Thus, the series of keystroke inputs, starting with stroke 512 on "W" key 510-A and culminating in stroke 514 on "R" key 510-B, results in the sequence of letters "water" entered into text 506. FIG. 5B also shows a line break entered into text 506 in response to activation (not shown) of the "Return" key on keyboard 501; text cursor 508 is positioned in the line after the line that includes the sequence of letters "water."

Figure 5C:
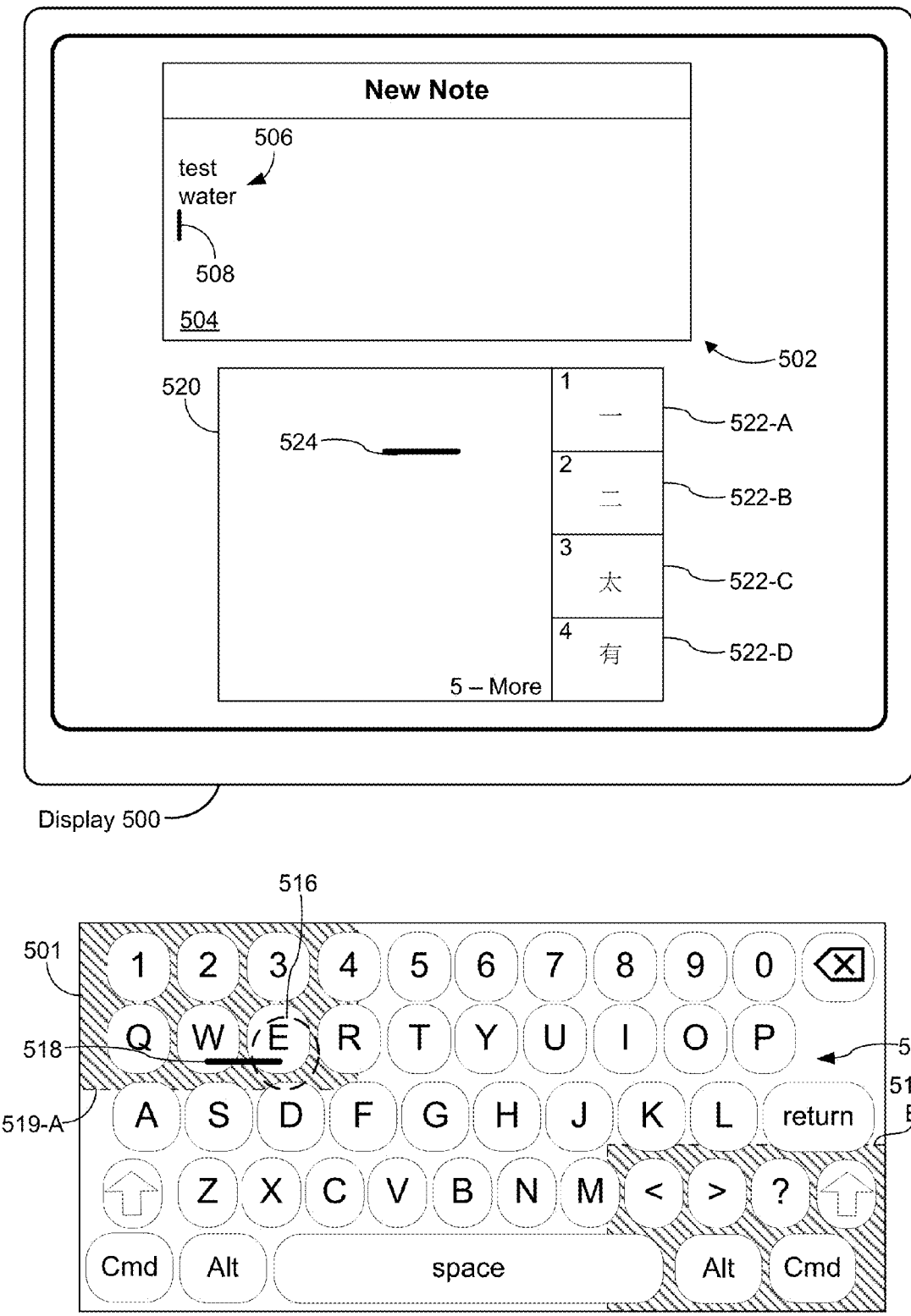

FIG. 5C shows contact 516 of a user performing character drawing 518 stroke-by-stroke on touch-sensitive keyboard 501. The user may perform character drawing 518 on touch-sensitive keyboard 501 by some combination of making, breaking, and moving of contact 516 on touch-sensitive keyboard 501. In response to detection of contact 516 performing drawing 518, character selection interface 520 is displayed on display 500. Drawn character 524 is displayed in character selection interface 520. Drawn character 524 is a graphical representation of character drawing 518, and traces character drawing 518 as character drawing 518 is made by the user on keyboard 501. It should be appreciated that character drawing 518 is not actually displayed on keyboard 501. Character drawing 518 is depicted on keyboard 501 in the Figures merely to indicate the strokes drawn on touch-sensitive keyboard 501 using contact 516.

In some embodiments, a contact or a gesture on keyboard 501 is not detected as an attempt to make a character drawing unless the contact is initiated in a predefined region on keyboard 501. For example, FIG. 5C shows predefined regions 519-A and 519-B. Contacts or gestures, such as contact 516, that are initiated in either of those regions and not detected as keystrokes are detected as attempts to input a character drawing.

The device determines or identifies one or more candidate characters 522 that match drawn character 524 as character drawing 518 is drawn. Candidate characters 522 may be, for example, Chinese characters, Japanese kana or kanji characters, Korean hanja or hangul characters, Vietnamese characters, Hindi characters, or Thai characters. Candidate characters 522 may be determined or identified for drawn character 524 based on a dictionary, a characters database, or the like.

In some embodiments, the device is configured to be in a mode corresponding to a particular language, so that drawn character 524 is matched to candidate characters 522 in accordance with the particular language. For example, the device as shown in FIGS. 5A-5M is configured in Chinese language mode; drawn character 524 is matched to Chinese candidate characters. The language mode on the device may be initially set according to a factory or default setting and subsequently changed by a user.

In some other embodiments, keyboard 501 is configured to be in a mode corresponding to a particular language, so that drawn character 524 is matched to candidate characters 522 in accordance with the particular language. For example, keyboard 501 as shown in FIG. 5A-5M is configured in Chinese language mode; drawn character 524 is matched to Chinese candidate characters. The language mode on keyboard 501 may be initially set according to a factory or default setting and subsequently changed by a user.

One or more of candidate characters 522 are displayed in character selection interface 520. These displayed candidate characters 522 are assigned respective numbers. For example, character "一" 522-A is assigned the number "1," character "二" 522-B is assigned the number "2," character "太" 522-C is assigned the number "3," and character "有" 522-D is assigned the number "4." A "More" option for displaying additional candidate characters is assigned the number "5." Selection of a number "1" thru "5" (e.g., by activating a corresponding number key on keyboard 501) selects the corresponding candidate character or option.

Figure 5D:
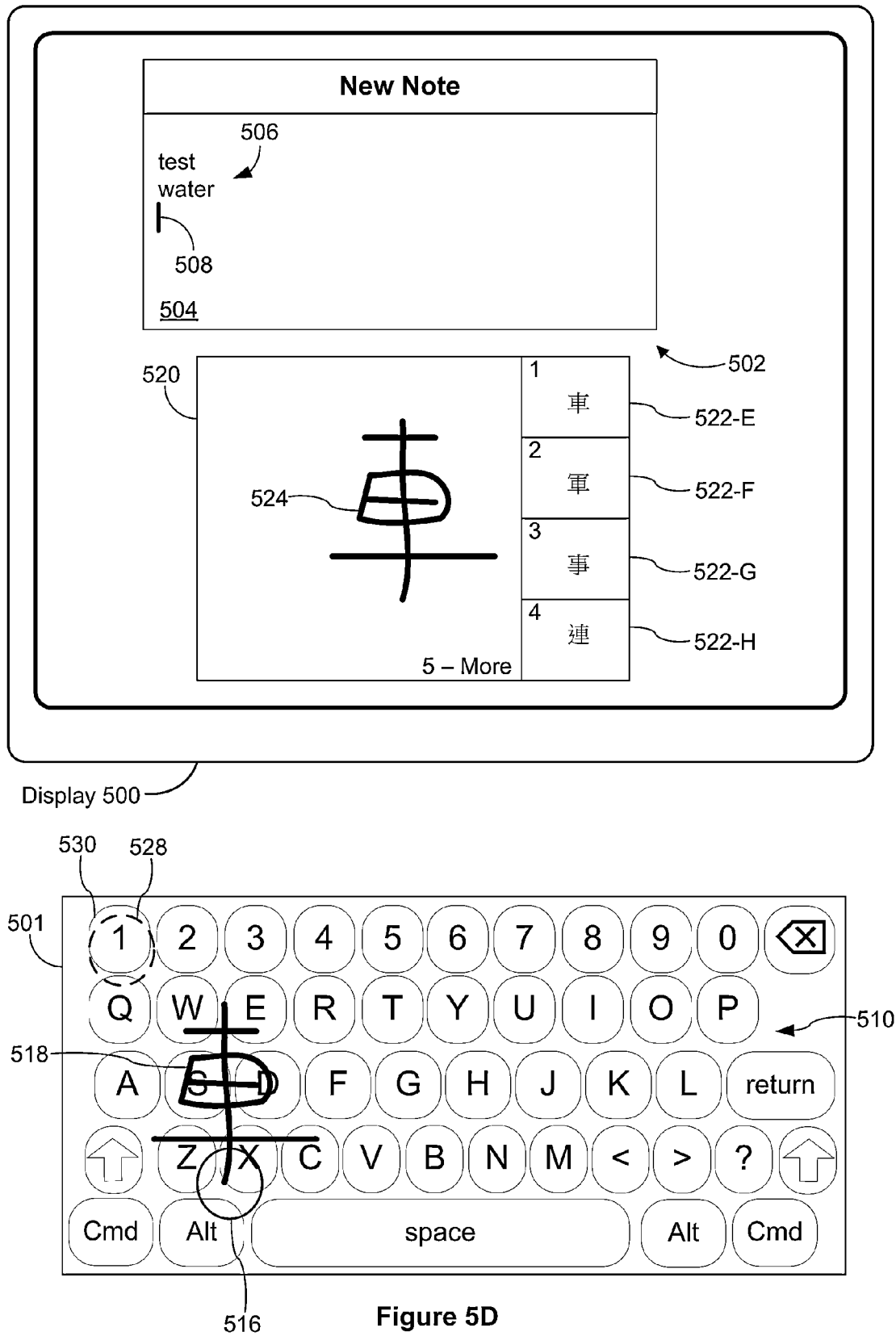

FIG. 5D shows completed character drawing 518 drawn on keyboard 501 by contact 516. The corresponding drawn character 524 is displayed on display 500. Candidate characters 522-E thru 522-H, which match drawn character 524 as shown in FIG. 5D, are displayed in character selection interface 520. Candidate characters 522-E thru 522-H are assigned numbers 1 thru 4, respectively. The number "5" is again assigned to the "More" option.

The numbers assigned to respective candidate characters 522 give the user a way to select a respective character. For example, in FIG. 5D, candidate character 522-E may be selected in response to the user activating the "1" key on keyboard 501, candidate character 522-F may be selected in response to the user activating the "2" key on keyboard 501, and so on. Similarly, in FIG. 5C, candidate character 522-A may be selected in response to the user activating the "1" key on keyboard 501 and so on. Another number (e.g., "5") may also be assigned to a "More" option or the like; in response to activation of the key corresponding to the number assigned to the "More" option, additional candidate characters may be displayed.

Figure 5E:
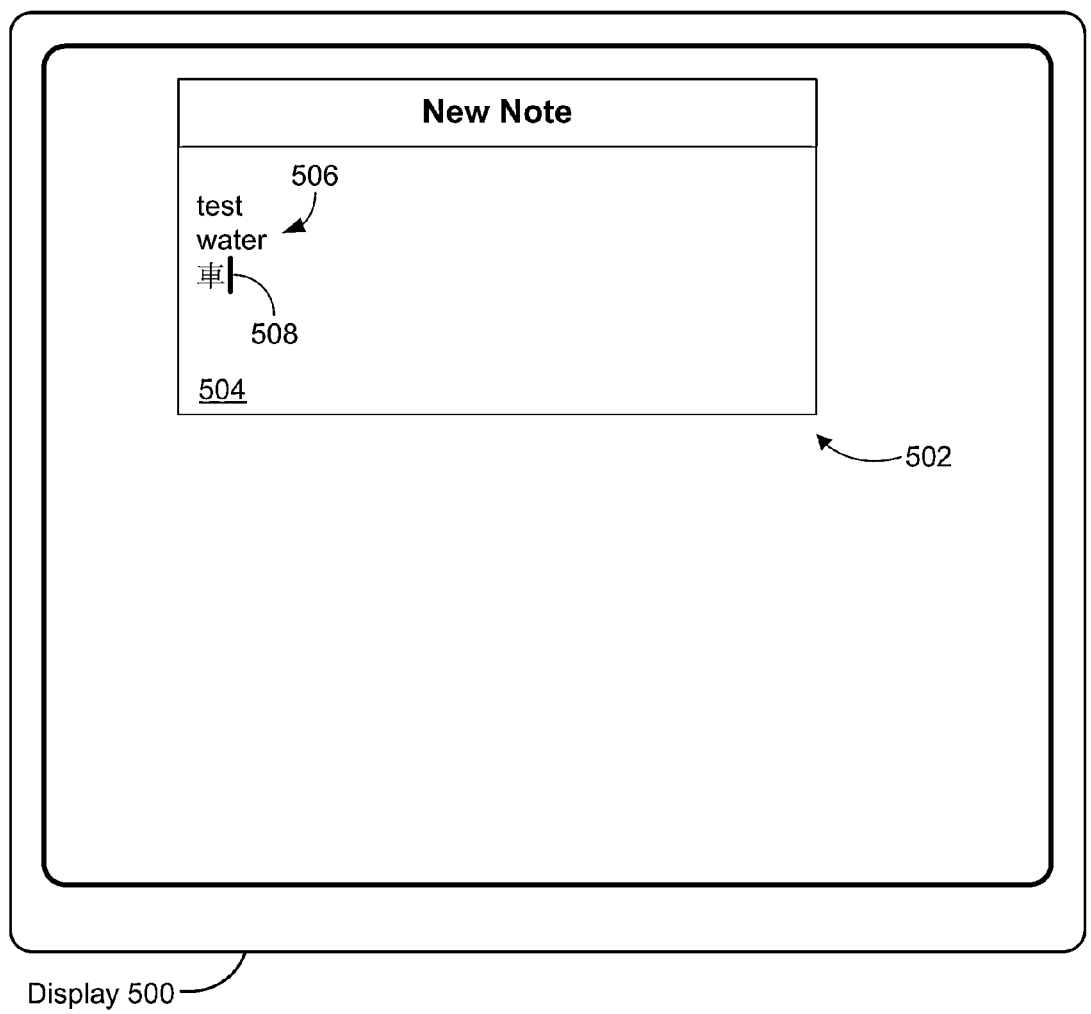
Figure 5E:
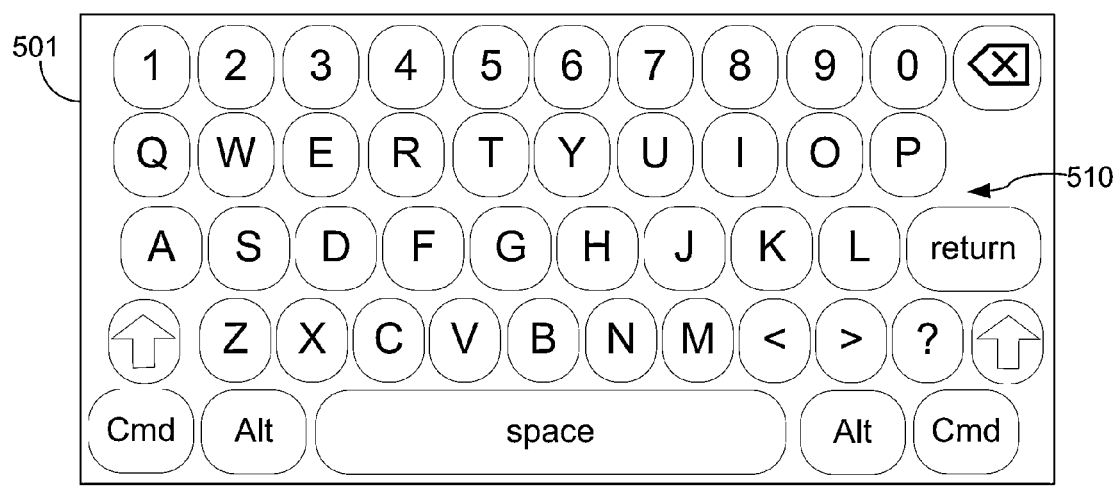

FIG. 5D shows keystroke 528 performed on "1" key 530, activating "1" key 530. In response to activation of "1" key 530, candidate character 522-E is selected. The selected candidate character 522-E is entered into text 506, as shown in FIG. 5E.

Thus, using a touch-sensitive keyboard, a user may enter characters by activating keys on the keyboard, or by drawing a character on the keyboard and selecting a candidate character.

In some embodiments, the device includes touch-sensitive keyboard 501 and a distinct touch-sensitive surface (e.g., touchpad 355, or touch-sensitive surface 451). Prior to the performance of character drawing 518, a cursor or pointer manipulation mode is active for the touch-sensitive surface; contacts and contact movements on the touch-sensitive surface manipulate pointer 503. In response to detection of the keystrokes entering the letters "water" (e.g., strokes 512, 514) or contact 516 performing character drawing 518, the cursor/pointer manipulation mode is maintained for the touch-sensitive surface. Thus, the problem of the user not being able to manipulate pointer 503 while a character is drawn on the touch-sensitive surface, because the use of touch-sensitive surface for character drawing precludes the concurrent use of the touch-sensitive surface for cursor/pointer manipulation, is avoided.

Figure 5F:
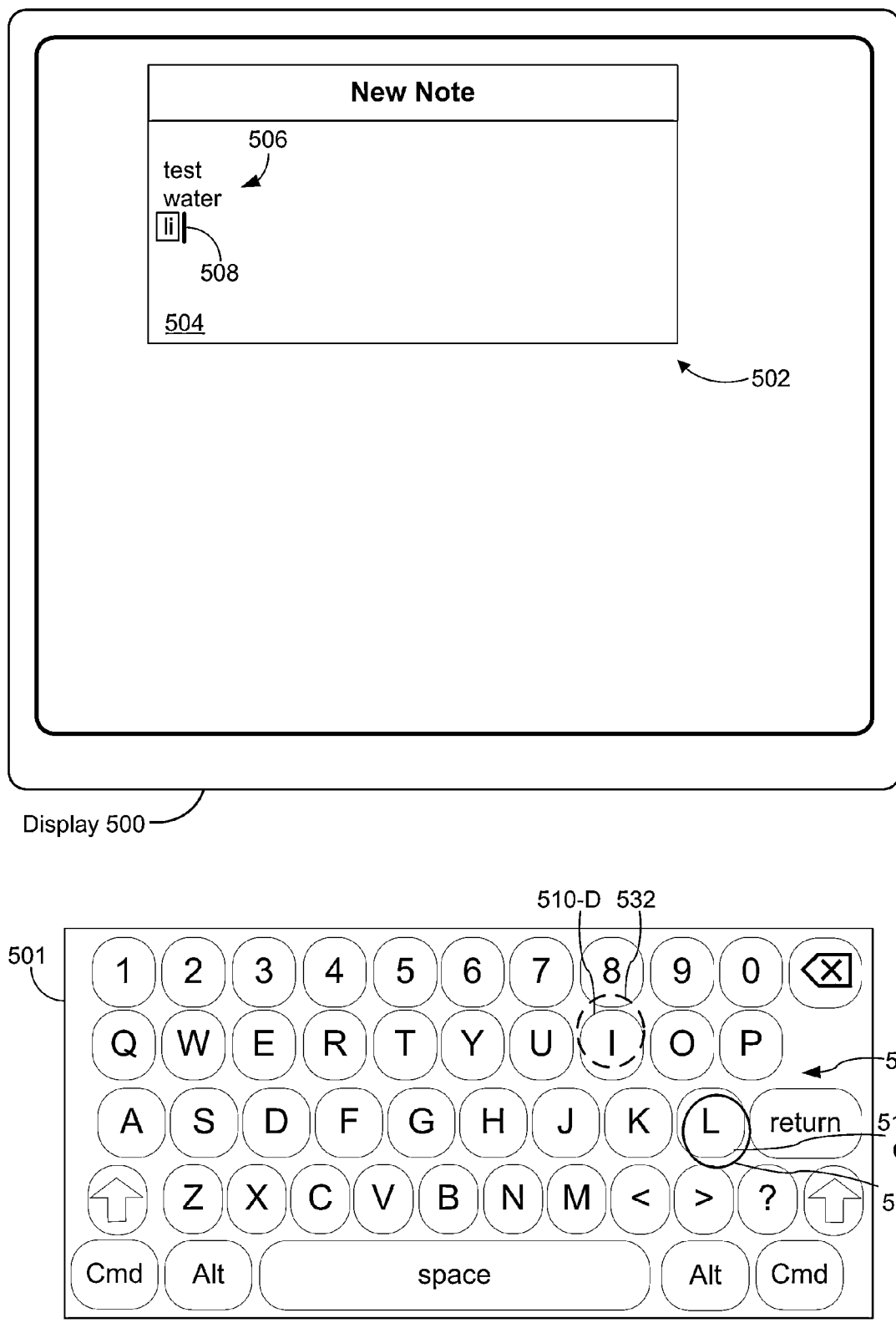
Figure 5G:
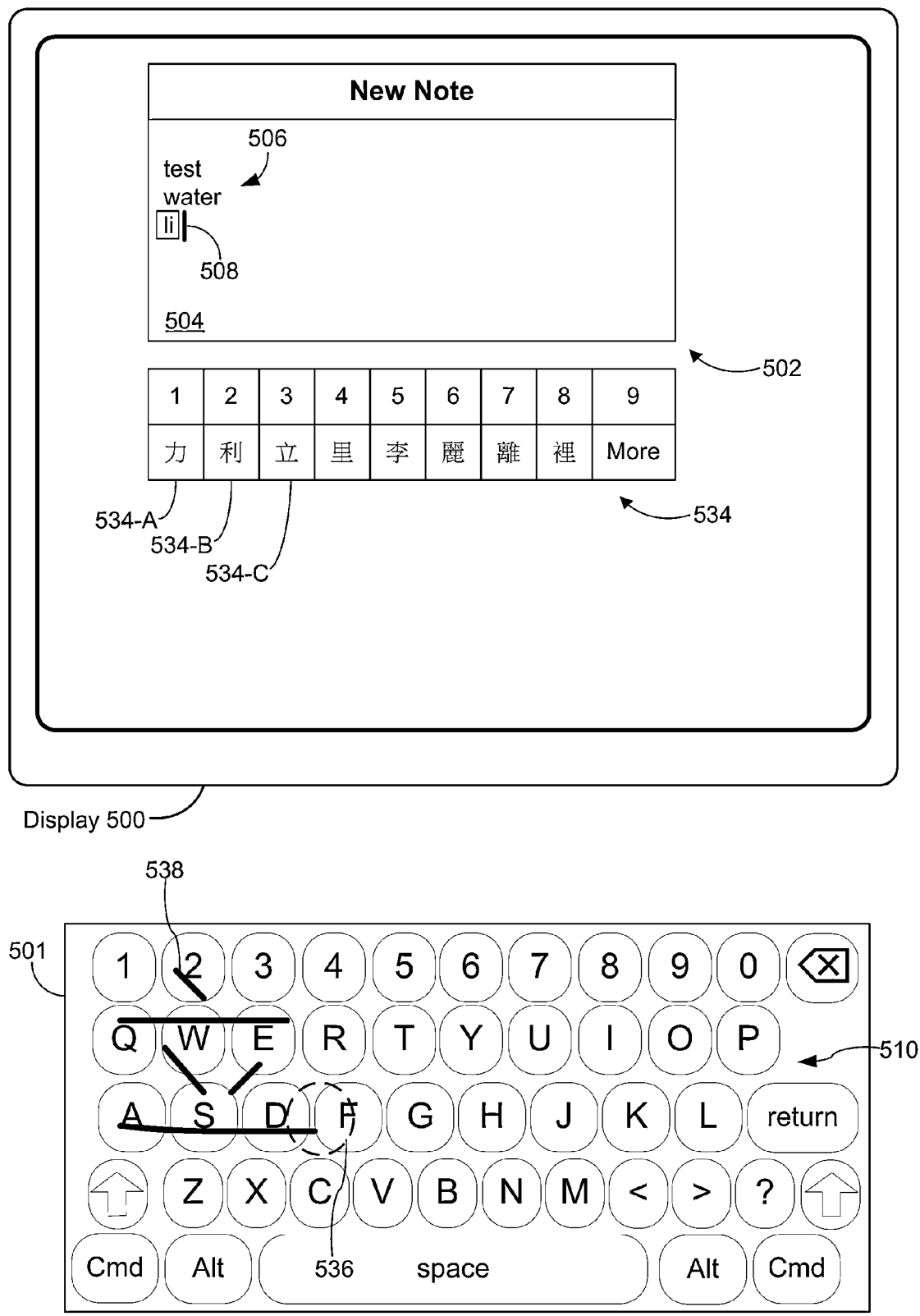

A sequence of letters entered into text 506 may correspond to romanizations of characters that are not written in the Latin alphabet. For example, FIG. 5F shows the sequence of letters "li" entered into text 506 in response to activation of "L" key 510-C with keystroke 531 and then activation of "I" key 510-D with keystroke 532. The sequence of letters "li" is a romanization of multiple Chinese characters. Multiple candidate characters 534 that have a corresponding romanization "li" are displayed, as shown in FIG. 5G. The displayed candidate characters 534, as well as the "More" option, are assigned respective numbers. For example, candidate character 534-A is assigned the number "1," candidate character 534-B is assigned the number "2," and so on. Candidate characters 534 that have the corresponding romanization "li" may be determined or identified based on a dictionary, a characters database, or the like.

In some embodiments, the user may select the desired candidate character 534 by drawing, partially or completely, the desired candidate character on touch-sensitive keyboard 501. FIG. 5G shows character drawing 538 performed on touch-sensitive keyboard 501 using contact 536. Character drawing 538 as shown matches candidate character 534-C as shown.

Figure 5H:
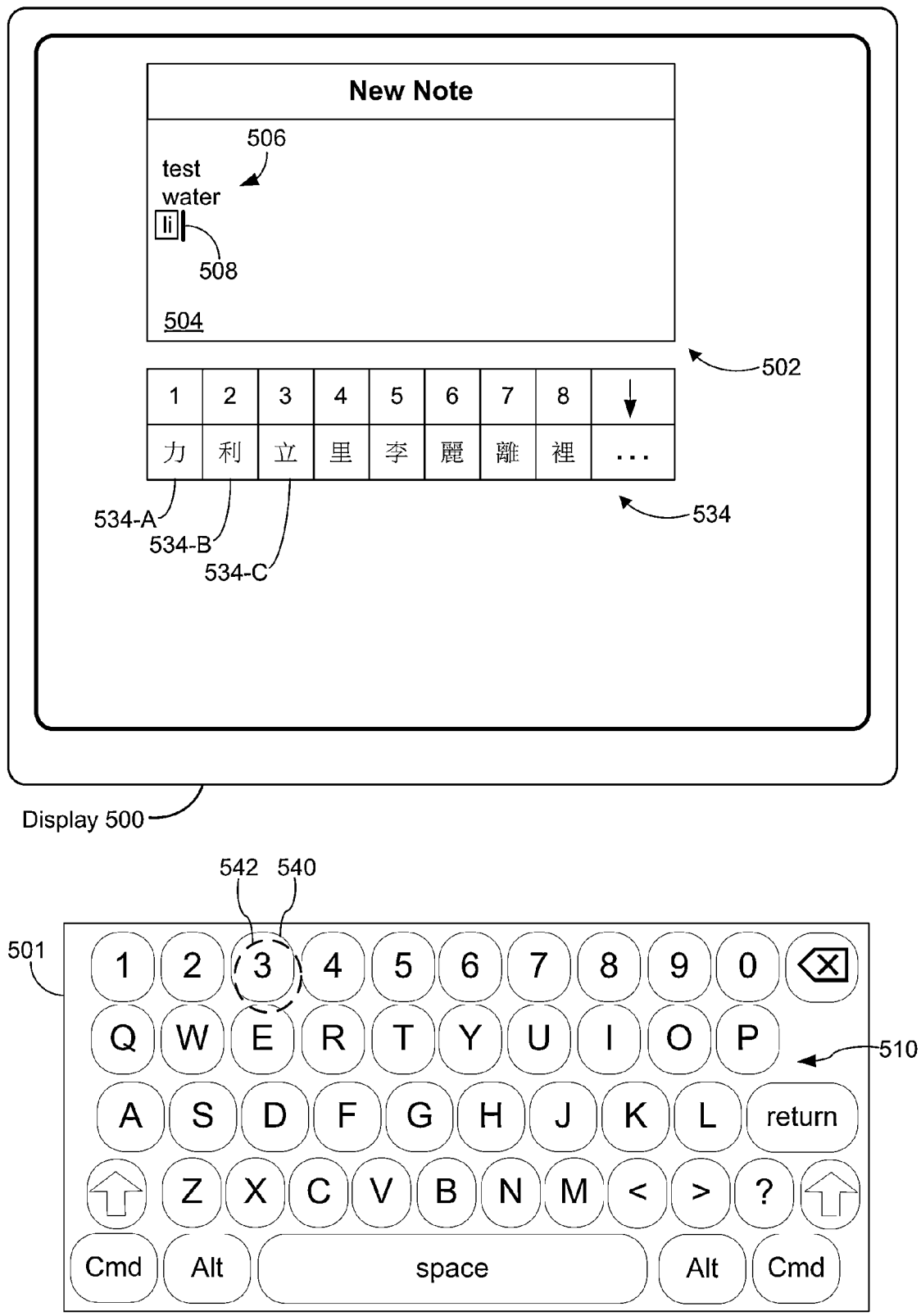

In some embodiments, the user may select a candidate character 534 by activating the number key for the corresponding assigned number on keyboard 501. For example, FIG. 5H shows activation of "3" key 540 by keystroke 542.

Figure 5I:
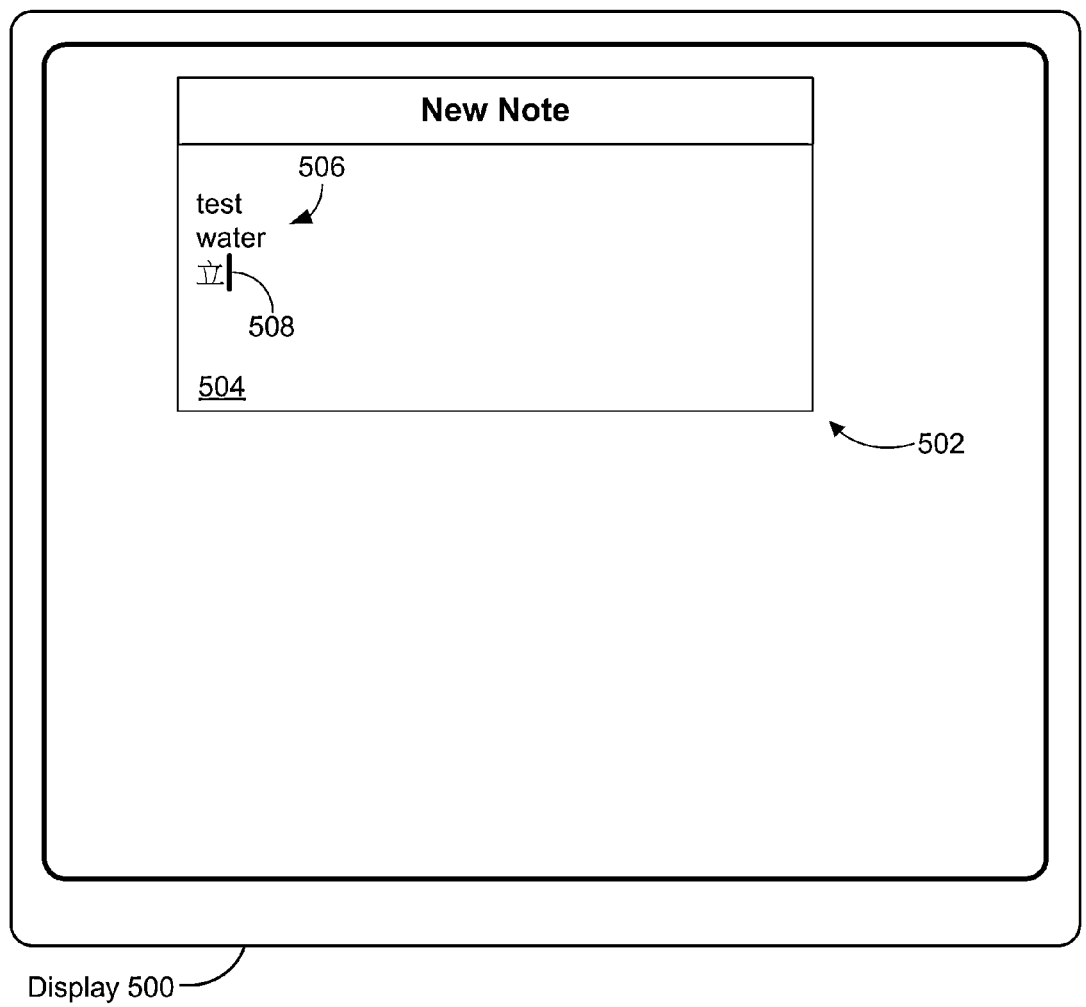
Figure 5I:
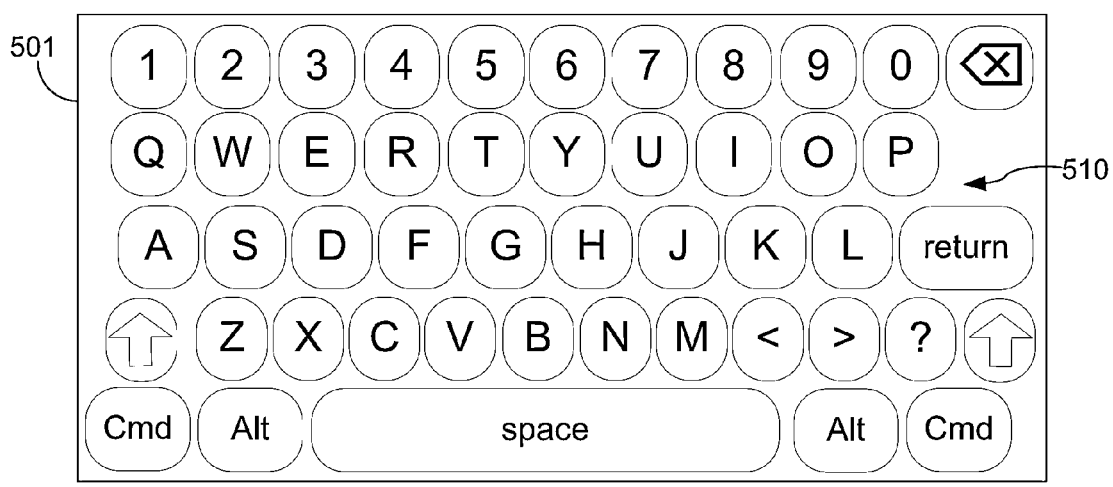
Figure 5J:
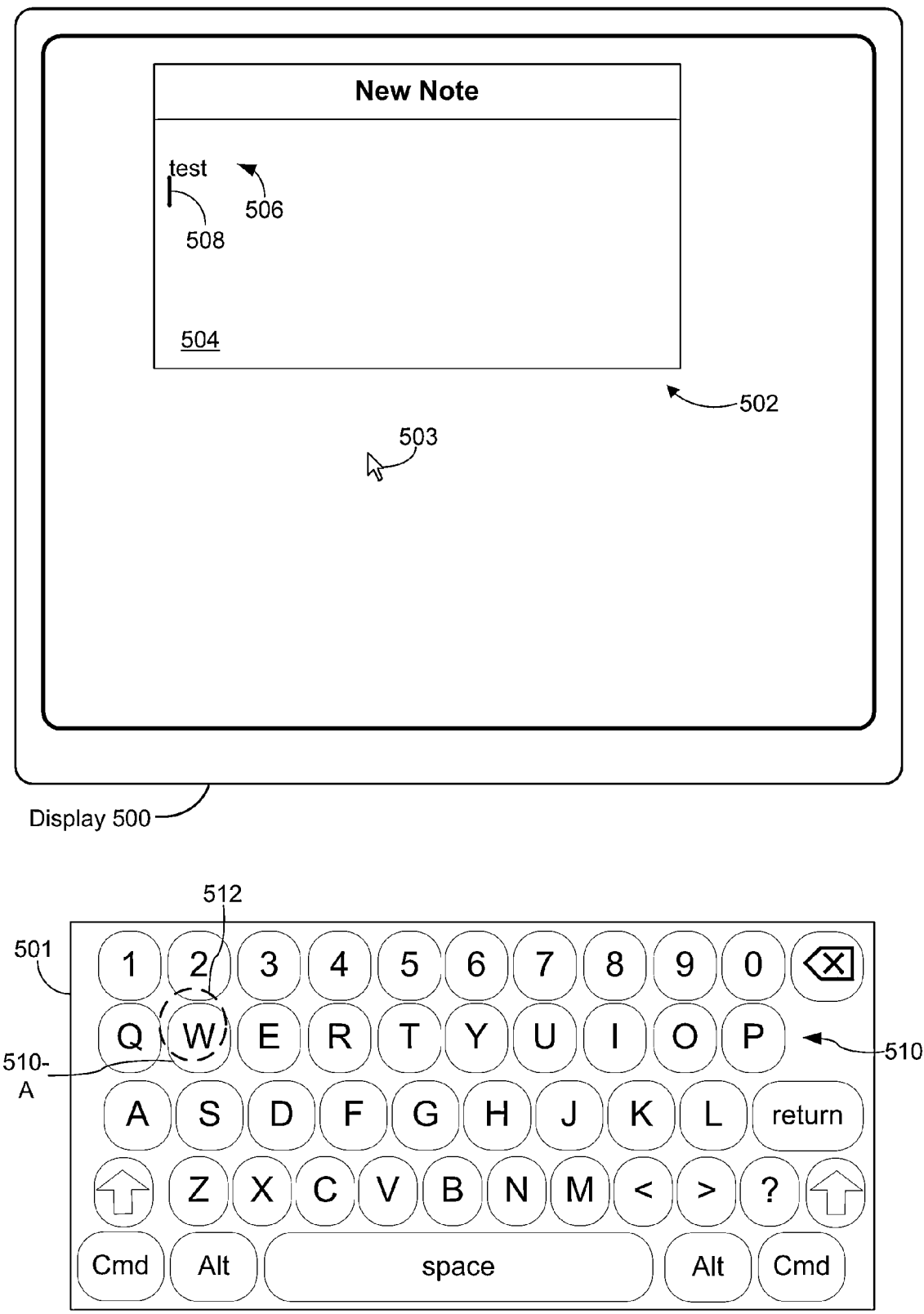

In response to detection of character drawing 538 or activation of "3" key 540, candidate character 534-C is entered into text 506, replacing the sequence of letters "li" in text 506, as shown in FIG. 5I.

Figure 5K:
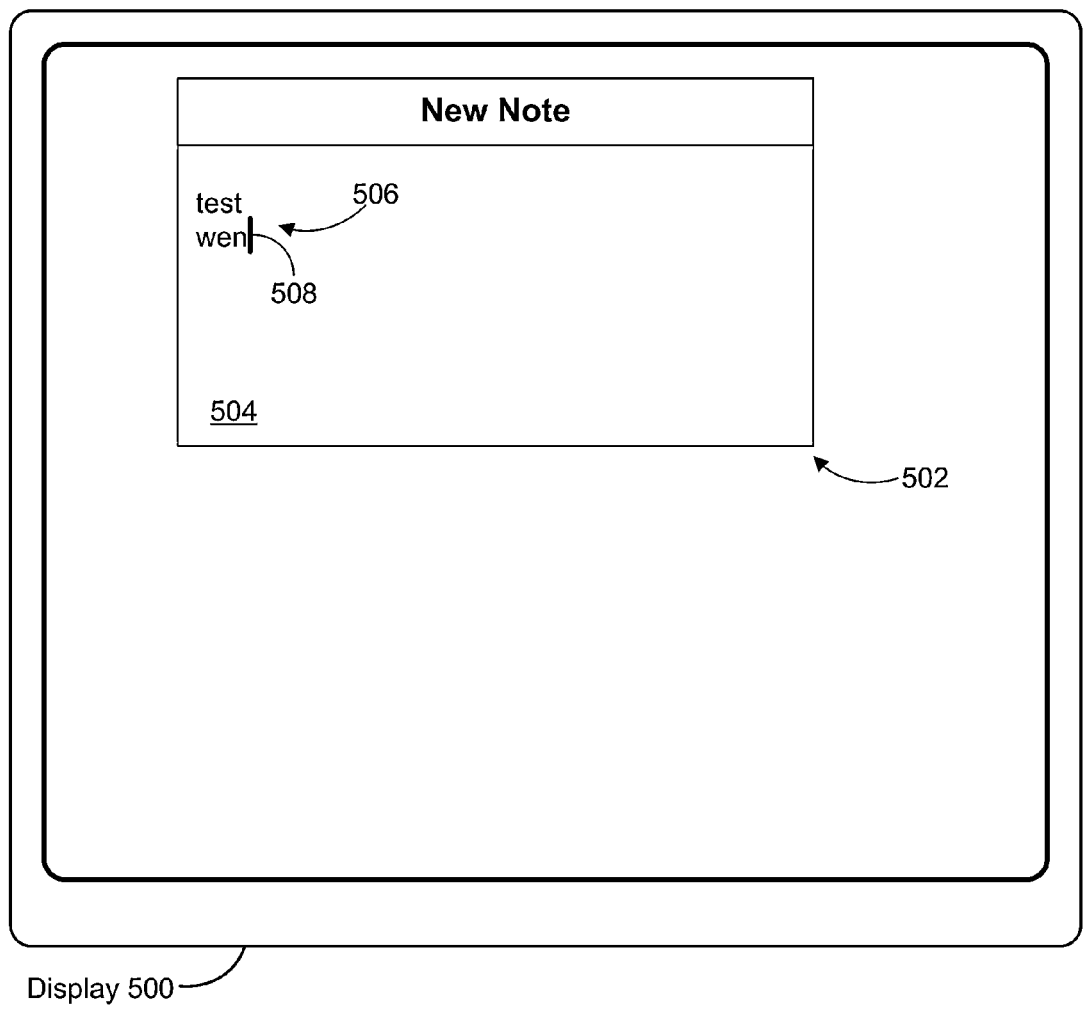
Figure 5K:
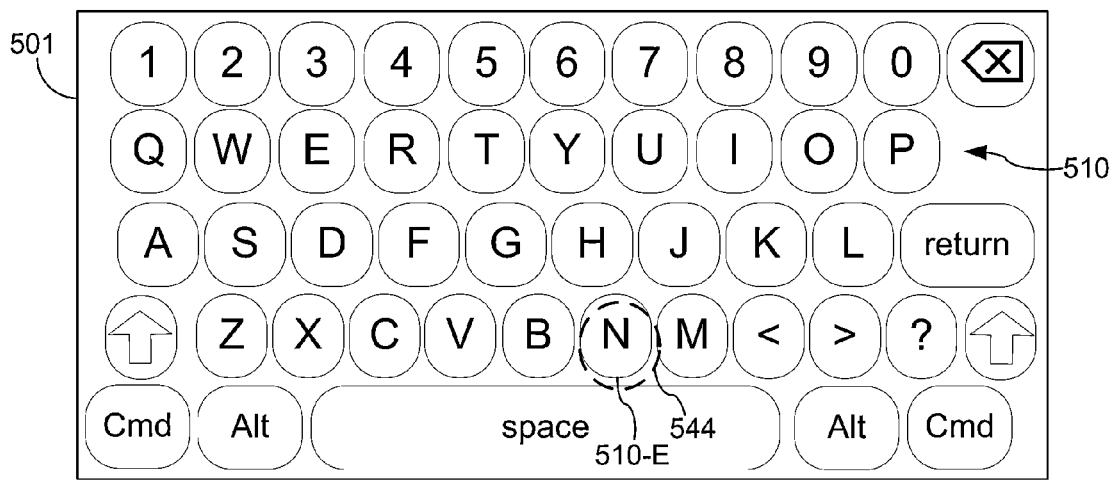

FIG. 5J shows again keystroke 512 activating "W" key 510-A. In response to the activation of "W" key 510-A, the letter "w" is entered into text 506, as shown in FIG. 5K. FIG. 5K also shows, instead of the letters "ater" entered into text 506 as shown in FIG. 5B, the letter "e" entered into text 506 in response to activation (not shown) of the "E" key on keyboard 501 and the letter "n" entered into text 506 in response to the activation of "N" key 510-E by keystroke 544. Thus, text 506 includes the sequence of letters "wen."

Figure 5L:
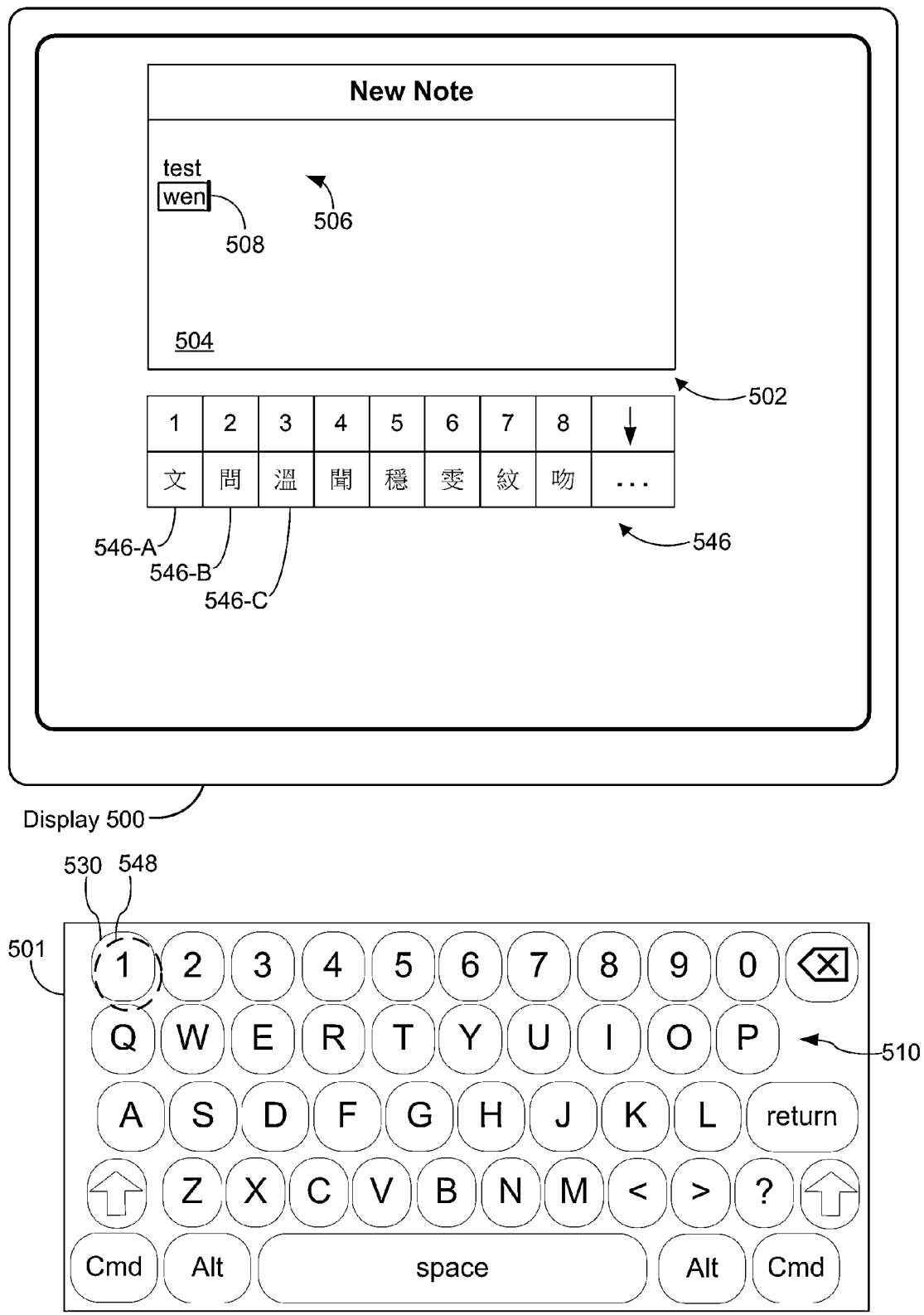

Keystroke 544 presses "N" key 510-E, activating "N" key 510-E, and holds "N" key 510-E down for at least a predefined amount of time (e.g., 0.5-2 seconds) without release. In response to the holding down of "N" key 510-E, candidate characters 546 that have the corresponding romanization "wen" are displayed on display 500, as shown in FIG. 5L. Respective candidate characters 546 are assigned numbers; candidate character 546-A is assigned the number "1," candidate character 546-B is assigned the number "2," and so on. Candidate characters 546 that have the corresponding the romanization "wen" may be determined or identified based on a dictionary, a characters database, or the like.

Figure 5M:
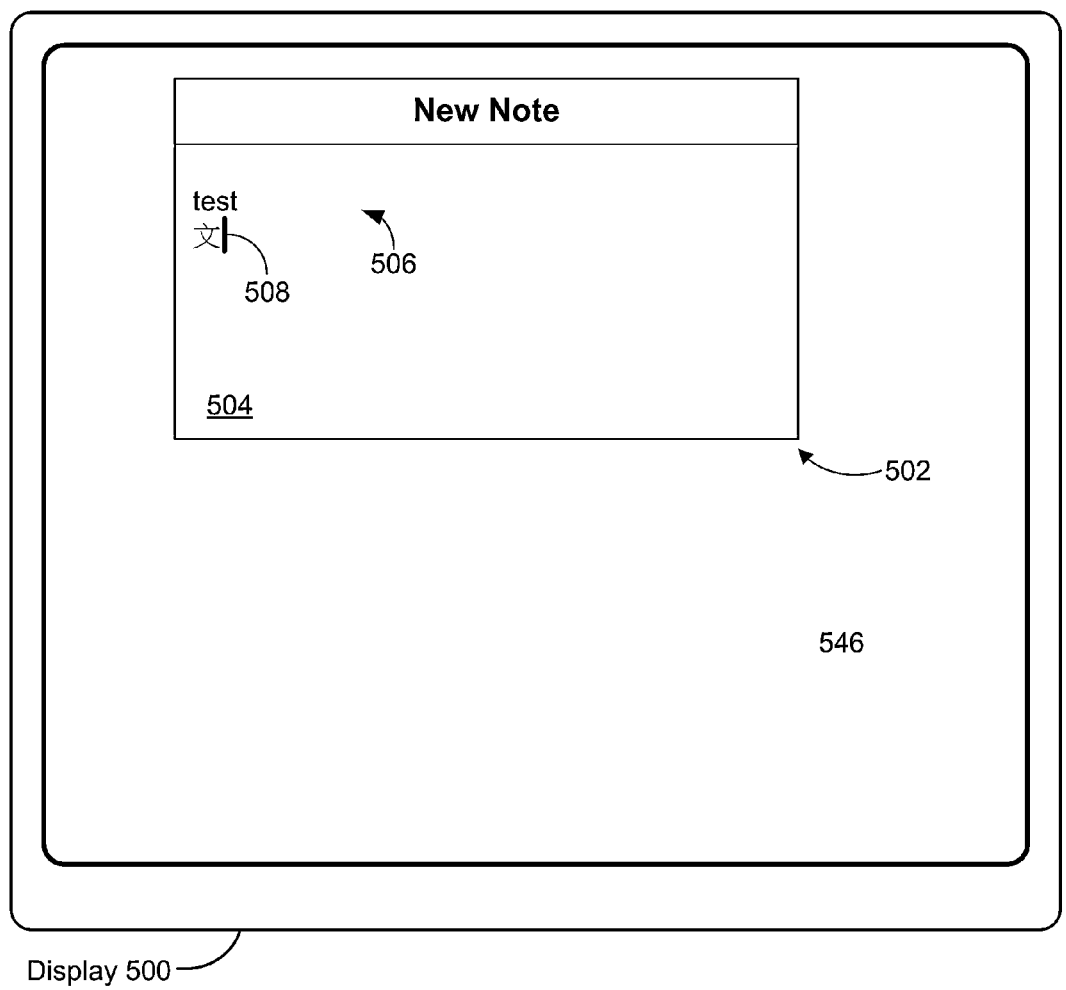
Figure 5M:
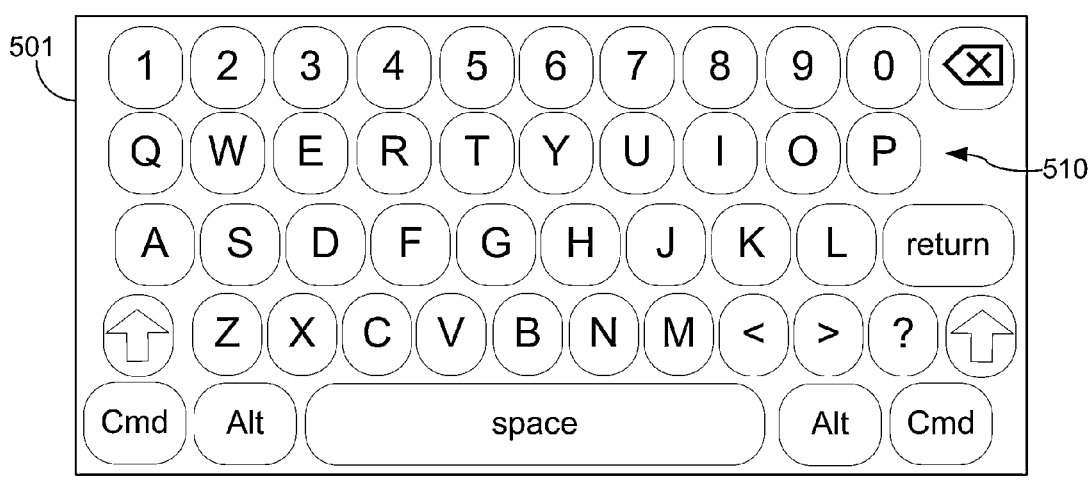

In FIG. 5L, keystroke 548, activating "1" key 530, is detected on keyboard 501. In response to the activation of "1" key 530, candidate character 546-A is selected and entered into text 506, replacing the sequence of letters "wen" in text 506 as shown in FIG. 5M.

Figure 5N:
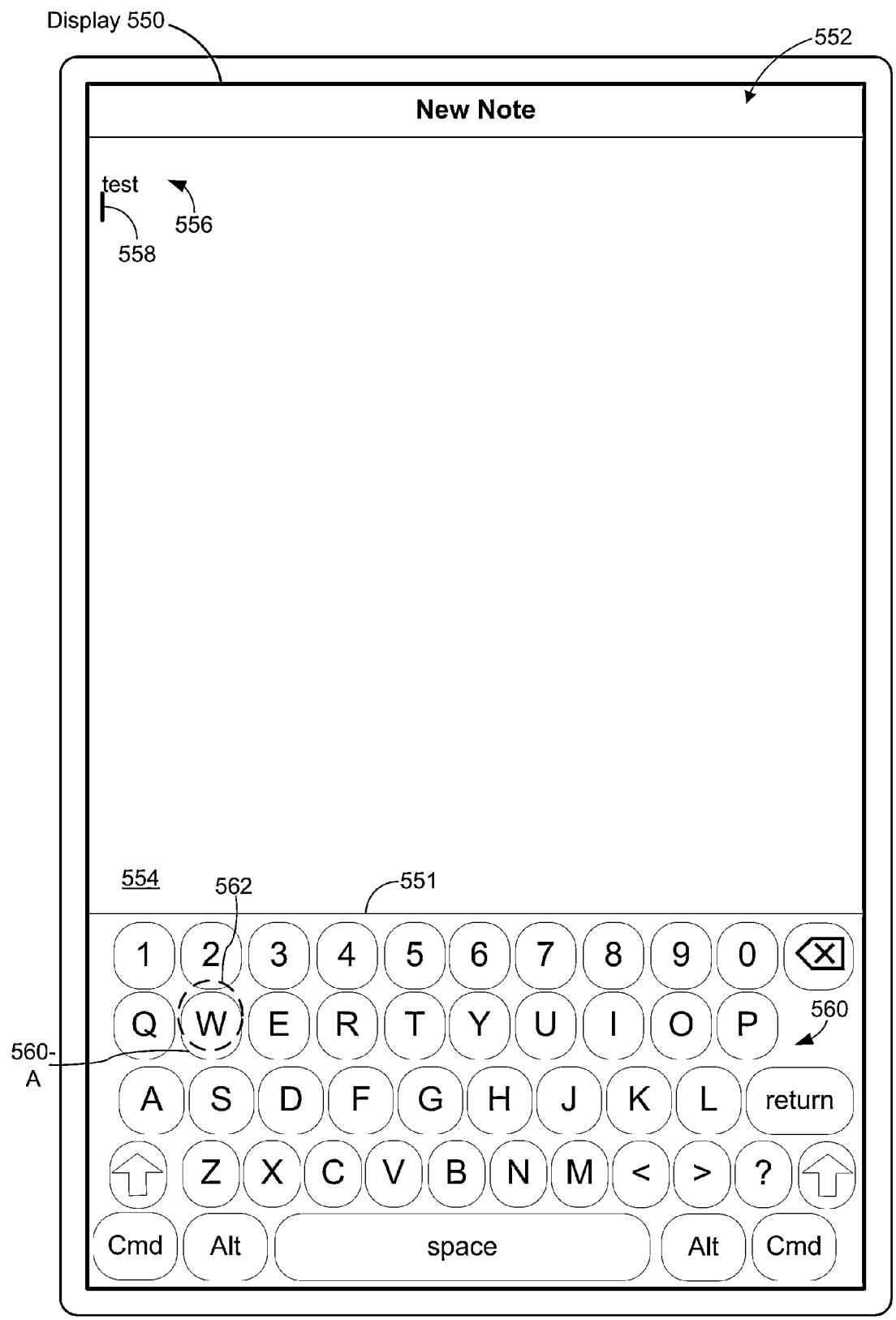
Figure 5O:
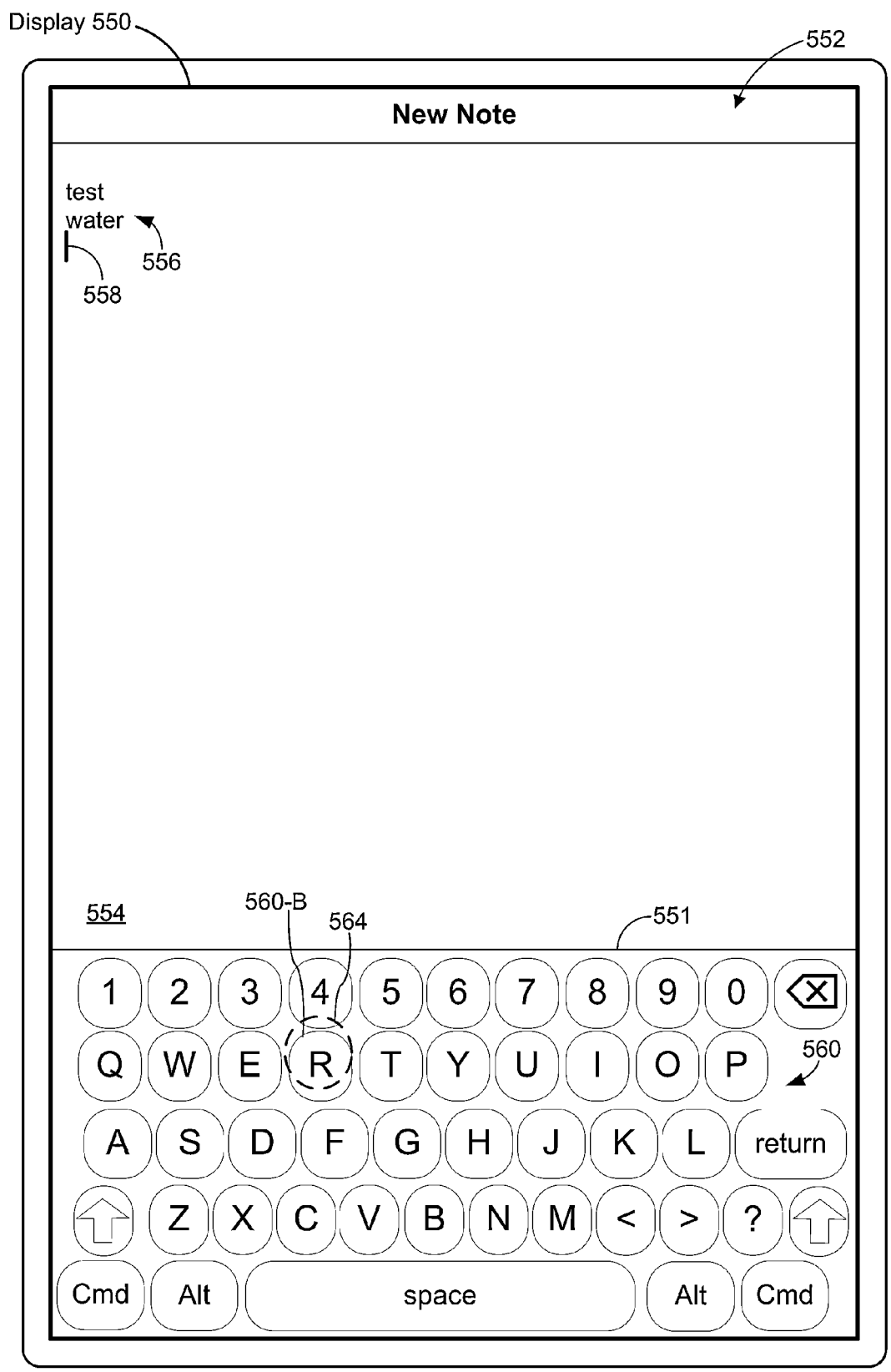
Figure 5P:
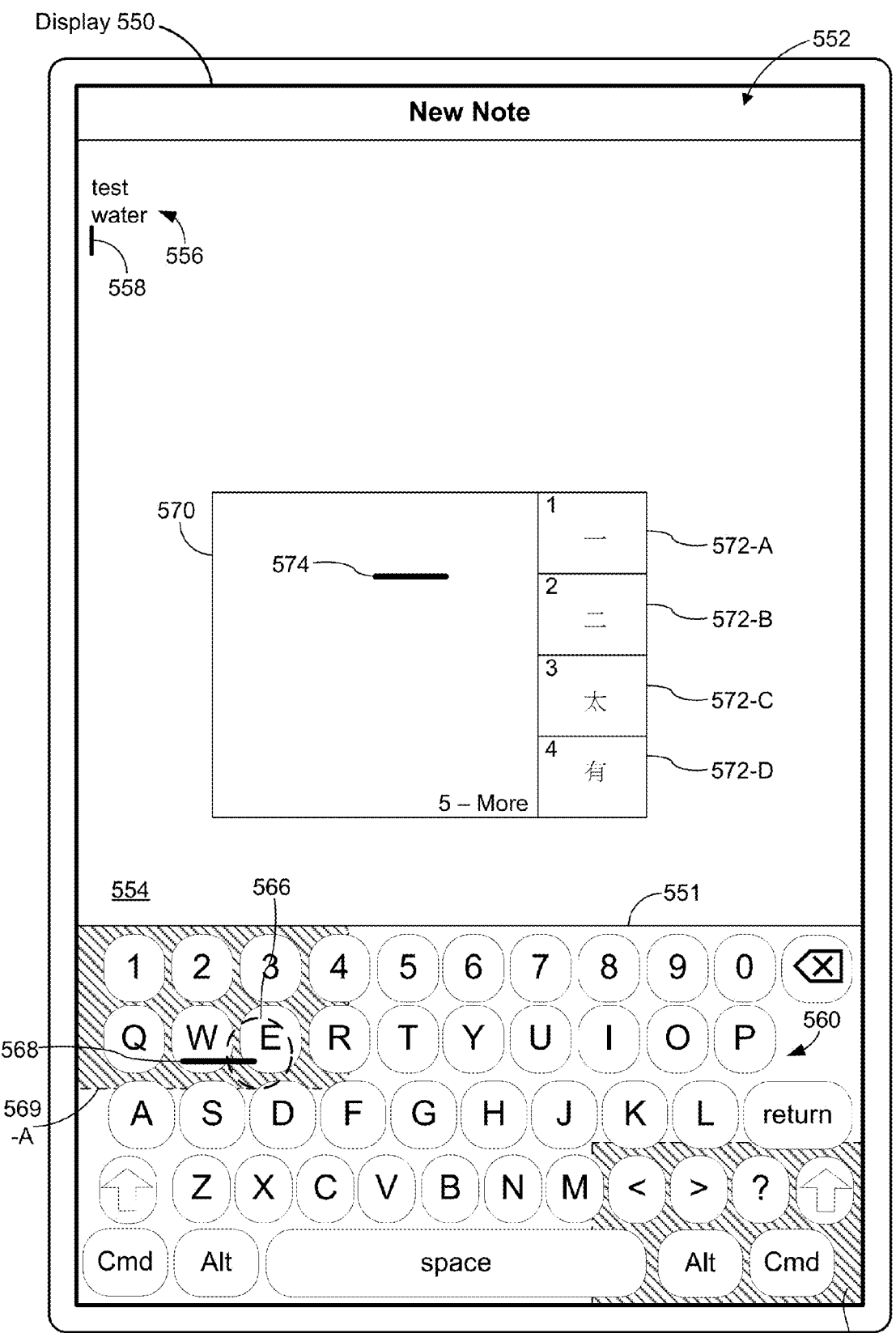
Figure 5Q:
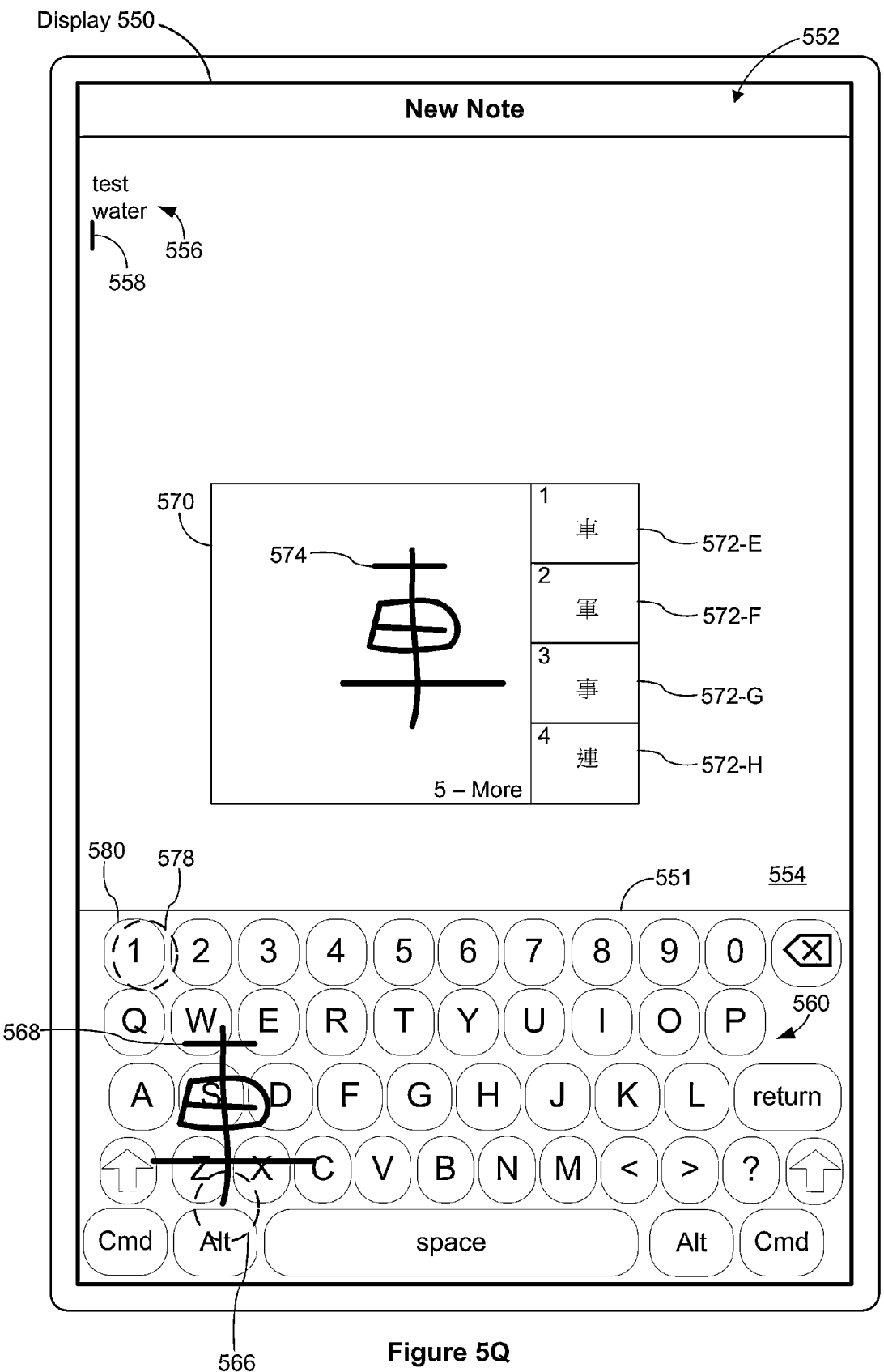
Figure 5R:
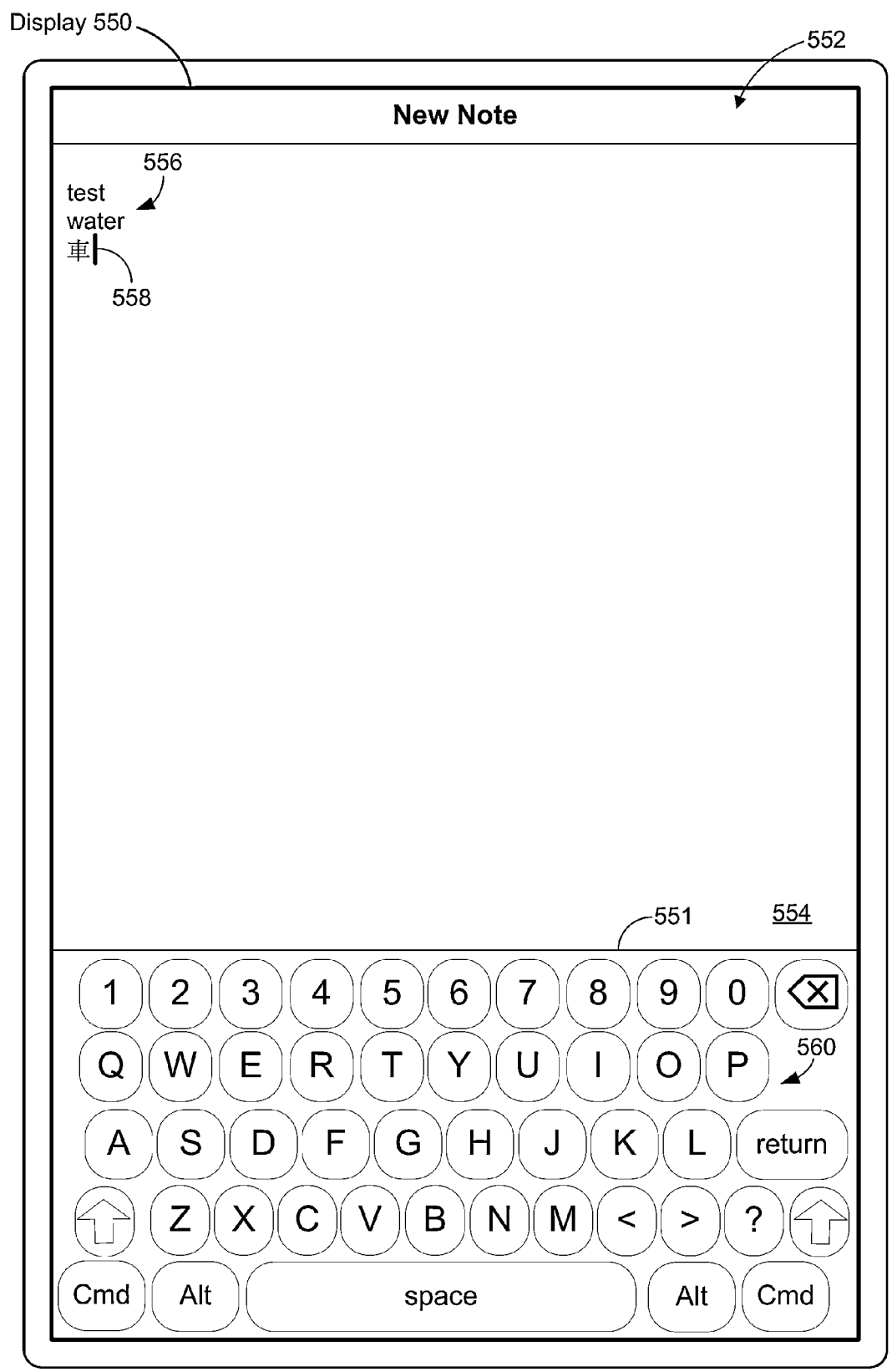
Figure 6A:
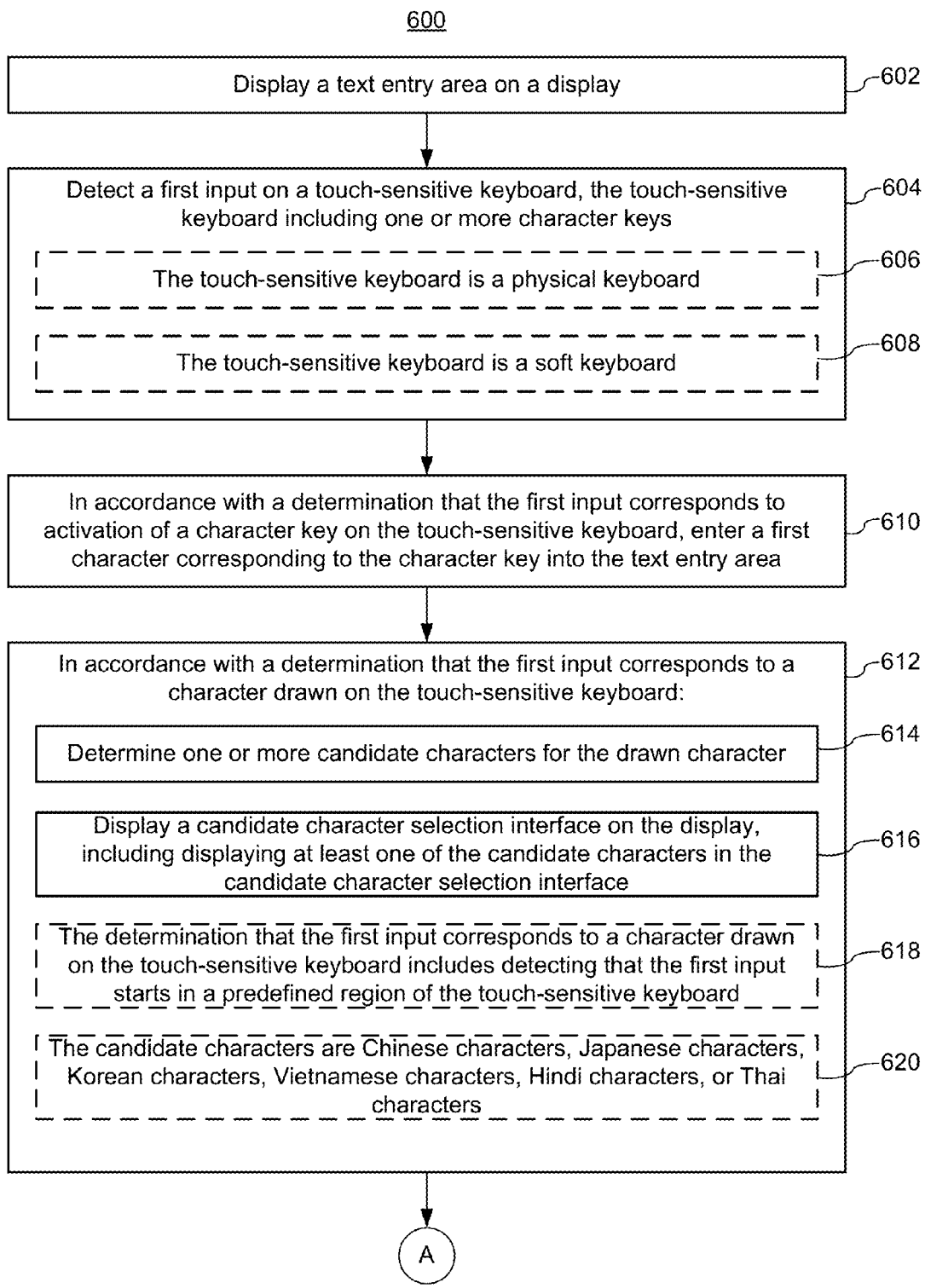
FIGS. 6A-6C are flow diagrams illustrating a method of entering characters using a touch-sensitive keyboard in accordance with some embodiments.
Figure 6B:
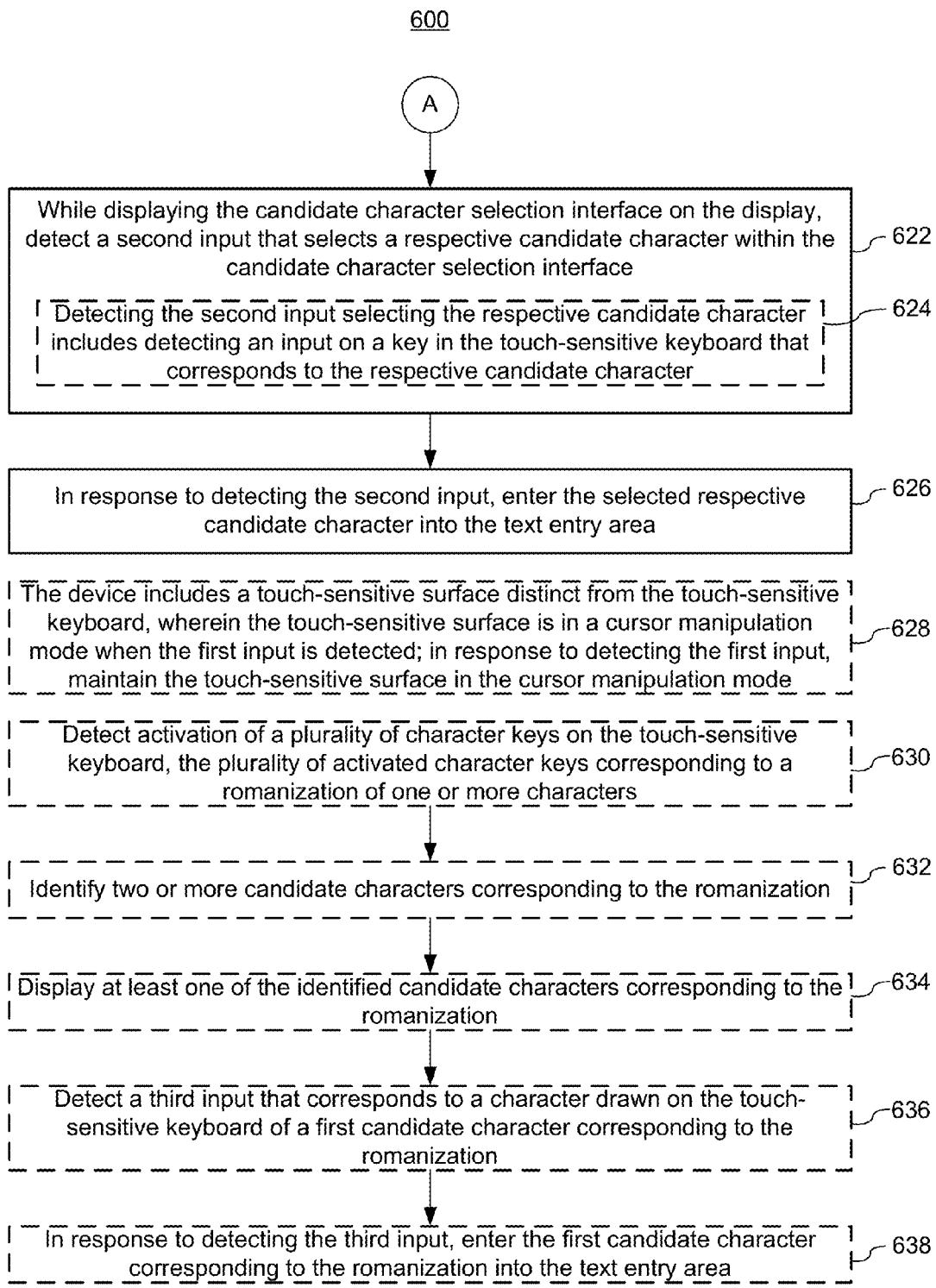
Figure 6C:
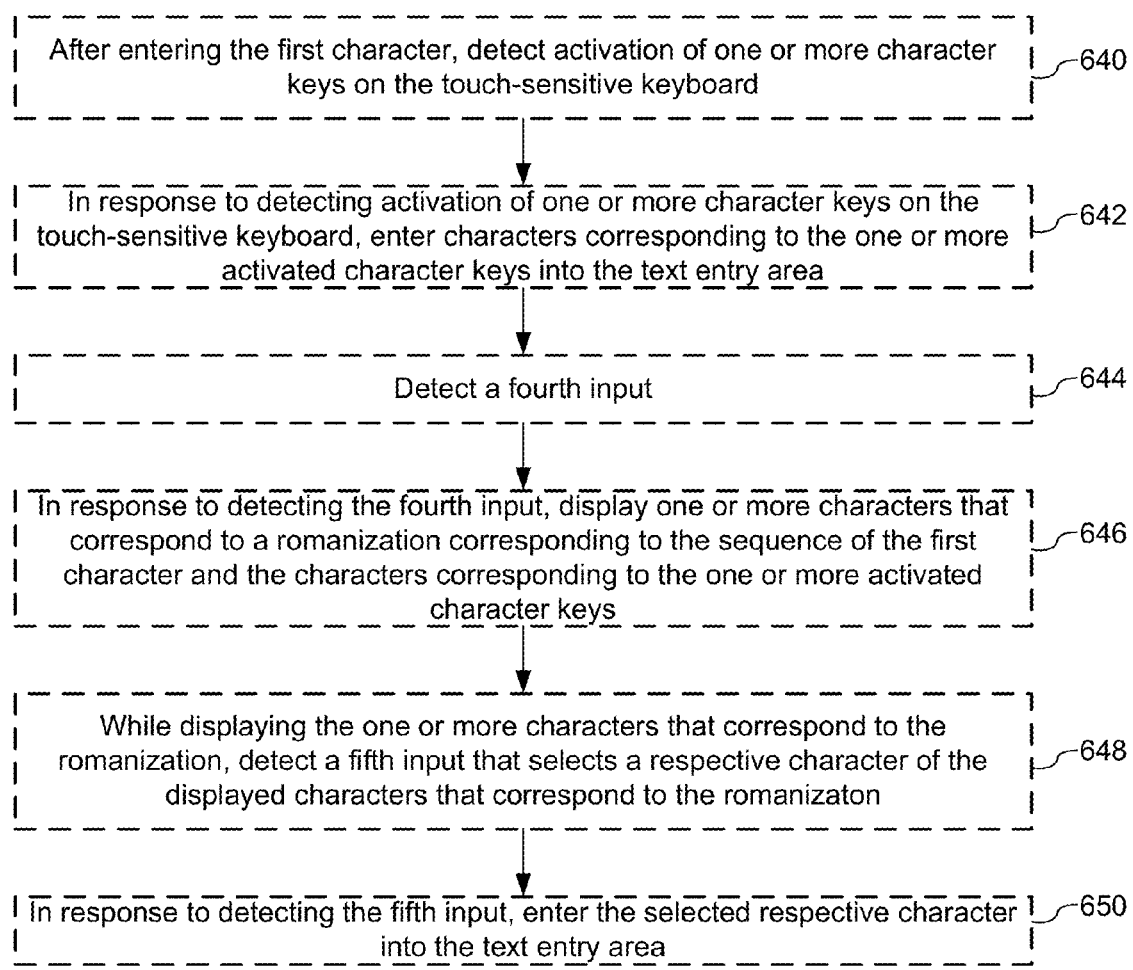

FIGS. 5N-5R illustrate an example of the user interfaces described above implemented on a device (e.g., device 100) with a touch-sensitive display (e.g., touch screen 112). FIG. 5N shows virtual keyboard 551 displayed on touch-sensitive display 550 of a device. Virtual keyboard 551 includes, among a multitude of keys, letter keys 560. Application window or interface 552 for a notes application is displayed on display 550. Input text 556 and cursor 558 (similar to text 506 and cursor 508 in FIG. 5A, respectively) are displayed in text entry area 554 in application interface 552.

In response to detection of a sequence of gestures (e.g., tap gestures) on various letter keys, including gesture 562 on "W" key 560-A and gesture 564 on "R" key 560-B, a sequence of letters "water" is entered into text 556, as shown in FIGS. 5N-5O.

FIG. 5P shows character drawing 568 performed stroke-by-stroke with contact 566 on touch-sensitive display 550 over virtual keyboard 551. The user may perform character drawing 568 over keyboard 551 by some combination of making, breaking, and moving of contact 566 over keyboard 551. In response to detection of contact 566 performing drawing 568, character selection interface 570 is displayed on display 550. Drawn character 574 is displayed in character selection interface 570. Drawn character 574 is a graphical representation of character drawing 568, and traces character drawing 568 as character drawing 568 is drawn by the user. It should be appreciated that character drawing 568 is not actually displayed on keyboard 551. Character drawing 568 is depicted in the Figures merely to indicate the strokes drawn on keyboard 551 using contact 566.

In some embodiments, a contact or a gesture on keyboard 551 is not detected as an attempt to make a character drawing unless the contact is initiated in a predefined region on keyboard 551. For example, FIG. 5P shows regions 569-A and 569-B. Contacts or gestures, such as contact 566, that are initiated in either of those regions and not detected as keystrokes (e.g., tap gestures on the keys) are detected as attempts to perform a character drawing.

The device determines one or more candidate characters 572 that match drawn character 574 as character drawing 568 is drawn. Candidate characters 572 may be, for example, Chinese characters, Japanese (e.g., kana or kanji) characters, Korean (e.g., hanja or hangul) characters, Vietnamese characters, Hindi characters, or That characters. Candidate characters 572 may be determined or identified for drawn character 574 based on a dictionary, a characters database, or the like.

In some embodiments, the device is configured to be in a mode corresponding to a particular language, so that drawn character 574 is matched to candidate characters 572 in accordance with the particular language. For example, the device as shown in FIG. 5N-5R is configured in Chinese language mode; drawn character 574 is matched to Chinese candidate characters. The language mode on the device may be initially set according to a factory or default setting and subsequently changed by a user.

In some other embodiments, keyboard 551 is configured to be in a mode corresponding to a particular language, so that drawn character 574 is matched to candidate characters 572 in accordance with the particular language. For example, keyboard 551 as shown in FIG. 5N-5R is configured in Chinese language mode; drawn character 574 is matched to Chinese candidate characters. The language mode on keyboard 551 may be initially set according to a factory or default setting and subsequently changed by a user.

One or more of candidate characters 572 are displayed in character selection interface 570. These displayed candidate characters 572 are assigned respective numbers. For example, candidate character 572-A is assigned the number "1," candidate character 572-B is assigned the number "2," candidate character 572-C is assigned the number "3," and candidate character 572-D is assigned the number "4." A "More" option for displaying additional candidate characters is assigned the number "5." Selection of a number "1" thru "5" (e.g., by performing a gesture on a corresponding number key on keyboard 551) selects the corresponding candidate character or option.

FIG. 5Q shows completed character drawing 568 drawn on keyboard 551 by contact 566. The corresponding drawn character 574 is displayed on display 550. Candidate characters 572-E thru 572-H, which match drawn character 574 as shown in FIG. 5Q, are displayed in character selection interface 570. Candidate characters 572-E thru 572-H are assigned numbers 1 thru 4, respectively. The number "5" is again assigned to the "More" option.

FIG. 5Q shows gesture (e.g., a tap gesture) 578 performed on "1" key 580. In response to detection of gesture 578 on "1" key 580, candidate character 572-E is selected. The selected candidate character 572-E is entered into text 556, as shown in FIG. 5R.

FIGS. 6A-6C are flow diagrams illustrating a method 600 of entering characters using a touch-sensitive keyboard in accordance with some embodiments. The method 600 is performed at an electronic device (e.g., device 300, FIG. 3, or portable multifunction device 100, FIG. 1) with a display and a touch-sensitive keyboard. In some embodiments, the display is a touch screen display and the touch-sensitive keyboard is a virtual keyboard displayed on the display. In some embodiments, the display is separate from the touch-sensitive keyboard. Some operations in method 600 may be combined and/or the order of some operations may be changed.

As described below, the method 600 provides an intuitive, efficient way to enter characters. The method reduces the physical and cognitive burden on a user when entering characters, thereby creating a more efficient human-machine interface. For battery-operated electronic devices, enabling a user to enter characters faster and more efficiently conserves power and increases the time between battery charges.

The device displays a text entry area on the display (602). The text entry area may be displayed in an application window or interface. For example, FIG. 5A shows text entry area 504 displayed on display 500, and FIG. 5N shows text entry area 554 displayed on touch-sensitive display 550.

The device detects a first input on the touch-sensitive keyboard, where the touch-sensitive keyboard includes one or more character keys (e.g., letter keys, number keys) (604). For example, FIG. 5A shows detection of keystroke 512 on "W" key 510-A, and FIG. 5N shows contact 562 detected on "W" key 560-A. As another example, FIG. 5C shows character drawing 518 being performed on keyboard 501 with contact 516.

In some embodiments, the touch-sensitive keyboard is a physical keyboard (606). For example, keyboard 501 (FIG. 5A) is a touch-sensitive physical keyboard. In some embodiments, the physical keyboard is made touch-sensitive by embedding capacitive sensors near the surface of the keys in the physical keyboard. In some embodiments, the keyboard is as described in any of the following U.S. patent applications, which are incorporated by reference herein in their entireties: (1) U.S. patent application Ser. No. 13/232,941, entitled "Enabling Touch Events on a Touch Sensitive Mechanical Keyboard"; (2) U.S. patent application Ser. No. 13/232,955, entitled "Fusion Keyboard"; (3) U.S. patent application Ser. No. 13/232,968, entitled "Actuation Lock for a Touch Sensitive Mechanical Keyboard"; (4) U.S. patent application Ser. No. 12/334,320, entitled "Motion Sensitive Mechanical Keyboard"; (5) U.S. patent application Ser. No. 12/333,793, entitled "Touch Sensitive Mechanical Keyboard"; (6) U.S. patent application Ser. No. 12/499,351, entitled "Image Processing for Camera Based Motion Tracking"; and (7) U.S. patent application Ser. No. 12/690,907, entitled "Piezo-Based Acoustic and Capacitive Detection."

In some embodiments, the touch-sensitive keyboard is a soft keyboard (608). For example, in FIG. 5N, keyboard 551 is a soft keyboard displayed on touch-sensitive display 550.

In accordance with a determination that the first input corresponds to activation of a character key on the touch-sensitive keyboard (e.g., detecting a keystroke on a physical key in a physical keyboard or detecting a tap gesture on a virtual key in a soft keyboard), the device enters a first character corresponding to the character key into the text entry area (610). For example, in response to detection of keystroke 512 activating "W" key 510-A, the letter "w" is entered into text 506, as shown in FIGS. 5A-5B. As another example, in response to detection of gesture 562 on "W" key 560-A, the letter "w" is entered into text 556, as shown in FIGS. 5N-5O.

In accordance with a determination that the first input corresponds to a character drawn on the touch-sensitive keyboard (612) (e.g., a character drawn on top of the character keys in the touch-sensitive keyboard with one or more finger gestures), the device determines one or more candidate characters for the drawn character (614) and displays a candidate character selection interface on the display, including displaying at least one of the candidate characters in the candidate character selection interface (616). For example, in FIGS. 5C-5D, in accordance with a determination that character drawing 518 is being drawn on keyboard 501, one or more candidate characters 522 are determined for drawn character 524, and character selection interface 520 and candidate characters 522 are displayed on display 500. Similarly, in FIGS. 5P-5Q, in accordance with a determination that character drawing 568 is being drawn on keyboard 551, one or more candidate characters 572 are determined for drawn character 574, and character selection interface 570 and candidate characters 572 are displayed on display 550.

In some embodiments, the determination that the first input corresponds to a character drawn on the touch-sensitive keyboard includes detecting that the first input starts in a predefined region of the touch-sensitive keyboard (618). For example, character drawing 518 in FIG. 5C is shown as starting in predefined region 519-A. As another example, character drawing 568 in FIG. 5P is shown as starting from predefined region 569-A.

In some embodiments, the candidate characters are Chinese characters, Japanese characters (e.g., kanji or kana), Korean characters (e.g., hanja or hangul), Vietnamese characters, Hindi characters, or That characters (620). For example, candidate characters 522 (FIGS. 5C-5D), 534 (FIG. 5G), 546 (FIG. 5L), and 572 (FIGS. 5P-5Q) are Chinese characters.

While displaying the candidate character selection interface on the display, the device detects a second input that selects a respective candidate character within the candidate character selection interface (622). For example, in FIG. 5D, while candidate characters 522-E thru 522-H are displayed, keystroke 528 activating "1" key 530 is detected. Candidate character 522-E is selected in response to the activation of "1" key 530. As another example, in FIG. 5Q, while candidate characters 572-E thru 572-H are displayed, contact 578 on "1" key 580 is detected. Candidate character 572-E is selected in response to detection of contact 578 on "1" key 580.

In some embodiments, detecting the second input selecting the respective candidate character includes detecting an input on a key in the touch-sensitive keyboard that corresponds to the respective candidate character (624). For example, keystroke 528 on "1" key 530 (FIG. 5D) selects candidate character 522-E, and contact 578 on "1" key 580 (FIG. 5Q) selects candidate character 572-E.

In response to detecting the second input, the device enters the selected respective candidate character into the text entry area (626). For example, in response to detection of keystroke 528 activating "1" key 530, candidate character 522-E is entered into text 506, as shown in FIG. 5E. As another example, in response to detection of contact 578 on "1" key 580, candidate character 572-E is entered into text 556, as shown in FIG. 5R. Note that when the device determines that a character is being drawn on top of the character keys in the touch-sensitive keyboard, drawing the character on top of the character keys does not result in entering any characters that correspond to the character keys that are drawn over by the one or more finger gestures. In other words, in contrast to the case where a keystroke or tap gesture on a character key results in entry of the corresponding character, when a character is being drawn on top of the character keys, the device does not enter a series of characters that correspond to the character keys being drawn over. For example, in FIG. 5C, when character drawing 518 is being drawn, "w" and "e" (the letters being drawn over) are not entered into text 506.

In some embodiments, the device includes a touch-sensitive surface distinct from the touch-sensitive keyboard, where the touch-sensitive surface is in a cursor manipulation mode when the first input is detected. In response to detecting the first input, the device maintains the touch-sensitive surface in the cursor manipulation mode (628). For example, the device includes or is connected to a trackpad that is separate from the touch-sensitive keyboard. The trackpad is in a cursor manipulation mode immediately prior to detecting the first input, when the first input is detected, and after the first input is detected. The trackpad does not need to toggle between a cursor manipulation mode and a character drawing mode because a user can just draw a character over the keys in the touch-sensitive keyboard. For example, the device includes a distinct touch-sensitive surface (e.g., touchpad 355) as well as touch-sensitive keyboard 501. Prior to detection of keystrokes (e.g., keystroke 512, 514) or contact 516 (making character drawing 518), the touch-sensitive surface is in a cursor manipulation mode; the touch-sensitive surface is used to manipulate pointer 503. In response to detection of the keystrokes or contact 516, the cursor manipulation mode is maintained for the touch-sensitive surface; the user can still use the touch-sensitive surface to manipulate pointer 503.

In some embodiments, the device detects activation of a plurality of character keys on the touch-sensitive keyboard (630), where the plurality of activated character keys corresponds to a romanization of one or more characters. For example, FIG. 5F shows detection of keystrokes 531 and 532 activating "L" key 510-C and "I" key 510-D. The letter sequence "li" corresponding to the activated keys correspond to the romanization of multiple characters (e.g., Chinese characters).

The device identifies two or more candidate characters corresponding to the romanization (632). The device displays at least one (in some embodiments, at least two) of the identified candidate characters corresponding to the romanization (634). In some embodiments, the identified candidate characters corresponding to the romanization are displayed in a candidate character selection interface on the display. For example, candidate characters 534 that have the romanization "li" are identified. At least two of them are displayed on displayed 500, as shown in FIG. 5G.

The device detects a third input that corresponds to a character drawn on the touch-sensitive keyboard of a first candidate character corresponding to the romanization (636). In response to detecting the third input, the device enters the first candidate character corresponding to the romanization into the text entry area (638). For example, contact 536 making character drawing 538, which as shown in FIG. 5G corresponds to candidate character 534-C, is detected on keyboard 501. In response to detection of contact 536 making character drawing 538, candidate character 534-C is selected and entered into text 506, as shown in FIG. 5I.

In some embodiments, after entering the first character, the device detects activation of one or more character keys on the touch-sensitive keyboard (640). For example, in FIGS. 5J-5K, after the entering of the letter "w" into text 506 in response to activation of "W" key 510-A by keystroke 512, a keystroke activating the "E" key and keystroke 544 activating "N" key 510-E are detected on keyboard 501.

In response to detecting activation of one or more character keys on the touch-sensitive keyboard, the device enters characters corresponding to the one or more activated character keys into the text entry area (642). For example, in response to detection of the activation of "W" key 510-A, the "E" key, and "N" key 510-E, the letters "wen" are entered into text 506, as shown in FIG. 5K.

The device detects a fourth input (644) (e.g., press and hold). For example, keystroke 544 may be a press and hold of "N" key 510-E, as shown in FIG. 5K.

In response to detecting the fourth input, the device displays one or more characters that correspond to a romanization corresponding to the sequence of the first character and the characters corresponding to the one or more activated character keys (646). For example, in response to detection of the press and hold keystroke 544, candidate characters 546 that have the corresponding romanization "wen" is displayed on display 500, as shown in FIG. 5L.

While displaying the one or more characters that correspond to the romanization, the device detects a fifth input that selects a respective character of the displayed characters that correspond to the romanization (648). For example, as shown in FIG. 5L, while candidate characters 546 are displayed, keystroke 548 on "1" key 530 is detected, which activates "1" key 530 and selects candidate character 546-A.

In response to detecting the fifth input, the device enters the selected respective character into the text entry area (650). In response to detection of keystroke 548 on "1" key 530, candidate character 546-A is entered into text 506, as shown in FIG. 5M.

It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein.

Figure 7:
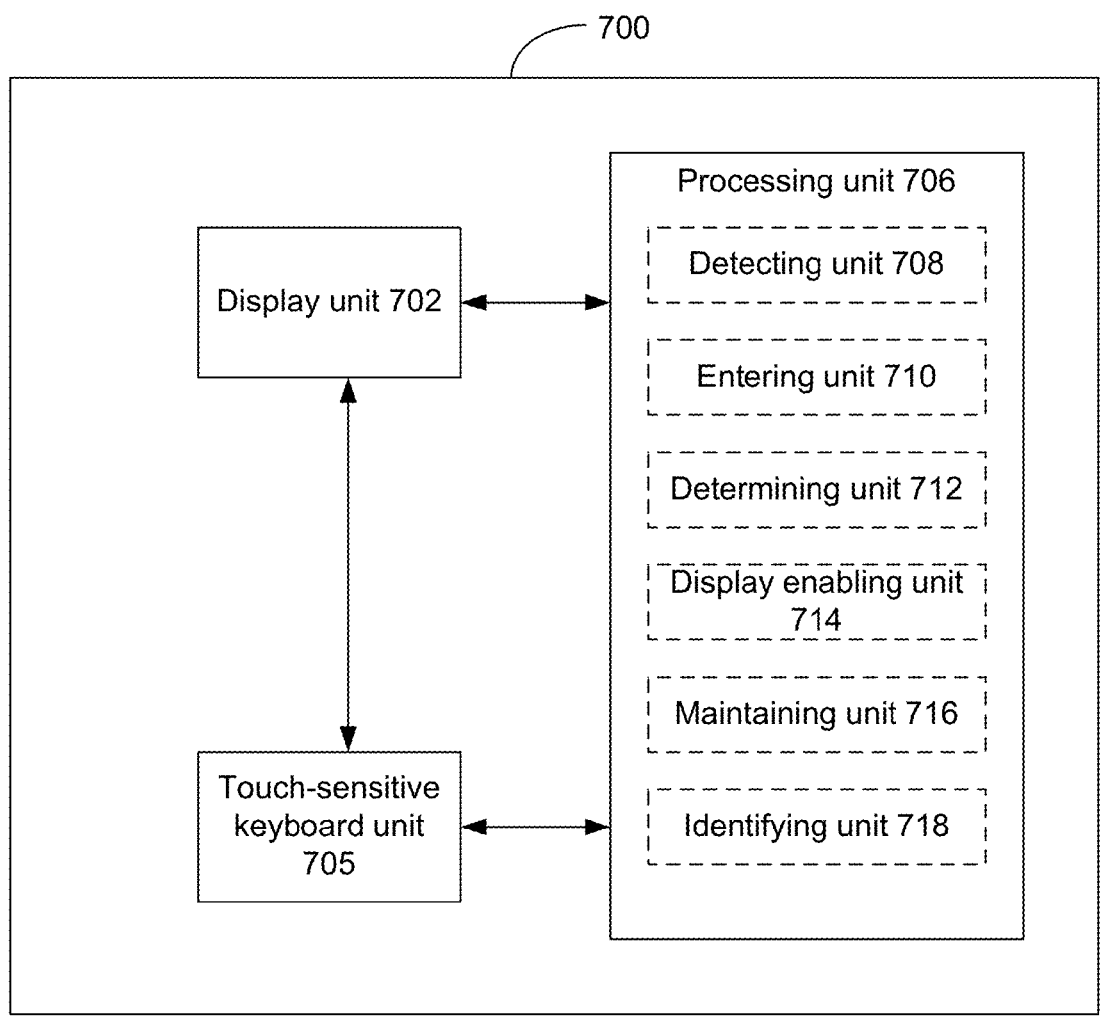
FIG. 7 is a functional block diagram of an electronic device in accordance with some embodiments.

In accordance with some embodiments, FIG. 7 shows a functional block diagram of an electronic device 700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein.

As shown in FIG. 7, an electronic device 700 includes a display unit 702 configured to display a text entry area, a touch-sensitive keyboard unit 705 configured to receive inputs, and a processing unit 706 coupled to the display unit 702 and the touch-sensitive keyboard unit 705. In some embodiments, the processing unit 706 includes a detecting unit 708, an entering unit 710, a determining unit 712, a display enabling unit 714, a maintaining unit 716, and an identifying unit 718.

The processing unit 706 is configured to: detect a first input on the touch-sensitive keyboard unit 705 (e.g., with the detecting unit 708), the touch-sensitive keyboard unit 705 including one or more character keys; in accordance with a determination that the first input corresponds to activation of a character key on the touch-sensitive keyboard unit 705, entering a first character corresponding to the character key into the text entry area (e.g., with the entering unit 710); in accordance with a determination that the first input corresponds to a character drawn on the touch-sensitive keyboard unit 705: determine one or more candidate characters for the drawn character (e.g., with the determining unit 712); and enable display of a candidate character selection interface on the display unit 702, including displaying at least one of the candidate characters in the candidate character selection interface (e.g., with the display enabling unit 714); while displaying the candidate character selection interface on the display unit 702, detect a second input that selects a respective candidate character within the candidate character selection interface (e.g., with the detecting unit 708); and in response to detecting the second input, enter the selected respective candidate character into the text entry area (e.g., with the entering unit 710).

In some embodiments, the touch-sensitive keyboard unit 705 is a physical keyboard.

In some embodiments, the touch-sensitive keyboard unit 705 is a soft keyboard.

In some embodiments, the device includes a touch-sensitive surface unit distinct from the touch-sensitive keyboard unit 705, wherein the touch-sensitive surface unit is in a cursor manipulation mode when the first input is detected, and the processing unit 706 is configured to, in response to detecting the first input, maintain the touch-sensitive surface unit in the cursor manipulation mode (e.g., with the maintaining unit 716).

In some embodiments, detecting the second input selecting the respective candidate character includes detecting an input on a key in the touch-sensitive keyboard unit 705 that corresponds to the respective candidate character.

In some embodiments, the determination that the first input corresponds to a character drawn on the touch-sensitive keyboard unit 705 includes detecting that the first input starts in a predefined region of the touch-sensitive keyboard unit 705.

In some embodiments, the processing unit 706 is configured to: detect activation of a plurality of character keys on the touch-sensitive keyboard unit 705 (e.g., with the detecting unit 708), the plurality of activated character keys corresponding to a romanization of one or more characters; identify two or more candidate characters corresponding to the romanization (e.g., with the identifying unit 718); enable display of at least one of the identified candidate characters corresponding to the romanization (e.g., with the display enabling unit 714); detect a third input that corresponds to a character drawn on the touch-sensitive keyboard unit 705 of a first candidate character corresponding to the romanization (e.g., with the detecting unit 708); in response to detecting the third input, enter the first candidate character corresponding to the romanization into the text entry area (e.g., with the entering unit 710).

In some embodiments, the processing unit 706 is configured to: after entering the first character, detect activation of one or more character keys on the touch-sensitive keyboard unit 705 (e.g., with the detecting unit 708); in response to detecting activation of one or more character keys on the touch-sensitive keyboard unit 705, enter characters corresponding to the one or more activated character keys into the text entry area (e.g., with the entering unit 710); detect a fourth input (e.g., with the detecting unit 708); in response to detecting the fourth input, enable display of one or more characters that correspond to a romanization corresponding to the sequence of the first character and the characters corresponding to the one or more activated character keys (e.g., with the display enabling unit 714); while displaying the one or more characters that correspond to the romanization, detect a fifth input that selects a respective character of the displayed characters that correspond to the romanization (e.g., with the detecting unit 708); and in response to detecting the fifth input, enter the selected respective character into the text entry area (e.g., with the entering unit 710).

In some embodiments, the candidate characters are Chinese characters, Japanese characters, Korean characters, Vietnamese characters, Hindi characters, or That characters.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6C may be implemented by components depicted in FIGS. 1A-1B. For example, detection operations 604 and 622, entering operations 610 and 626, determining operation 614, and displaying operation 616 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a display;
a touch-sensitive keyboard;
one or more processors;
memory; and
one or more programs, wherein the one or more programs are stored in the memory and configured to be executed by the one or more processors, the one or more programs including instructions for:
displaying a text entry area on the display;
detecting a first input on the touch-sensitive keyboard, the touch-sensitive keyboard including one or more character keys;
in accordance with a determination that the first input corresponds to activation of a character key on the touch-sensitive keyboard, entering a first character corresponding to the character key into the text entry area;
in accordance with a determination that the first input corresponds to a first portion of a character drawn on the touch-sensitive keyboard and in accordance with detecting that the first input starts in a predefined region of the touch-sensitive keyboard that is a smaller subset of area than the entire keyboard area and that includes one or more character keys:
determining one or more candidate characters for the drawn first portion of the character; and
displaying a candidate character selection interface on the display, including displaying at least one of the candidate characters in the candidate character selection interface;
while displaying the candidate character selection interface on the display, detecting a second input that selects a respective candidate character within the candidate character selection interface; and
in response to detecting the second input, entering the selected respective candidate character into the text entry area.

2. The device of claim 1, wherein the touch-sensitive keyboard is a soft keyboard.

3. The device of claim 1, wherein the device includes a touch-sensitive surface distinct from the touch-sensitive keyboard, wherein the touch-sensitive surface is in a cursor manipulation mode when the first input is detected, the device including instructions for:
in response to detecting the first input, maintaining the touch-sensitive surface in the cursor manipulation mode.

4. The device of claim 1, wherein detecting the second input selecting the respective candidate character includes detecting an input on a key in the touch-sensitive keyboard that corresponds to the respective candidate character.

5. The device of claim 1, including instructions for:
detecting activation of a plurality of character keys on the touch-sensitive keyboard, the plurality of activated character keys corresponding to a romanization of one or more characters;
identifying two or more candidate characters corresponding to the romanization; displaying at least one of the identified candidate characters corresponding to the romanization;
detecting a third input that corresponds to a character drawn on the touch-sensitive keyboard of a first candidate character corresponding to the romanization;
in response to detecting the third input, entering the first candidate character corresponding to the romanization into the text entry area.

6. The device of claim 1, including instructions for:
after entering the first character, detecting activation of one or more character keys on the touch-sensitive keyboard;
in response to detecting activation of one or more character keys on the touch-sensitive keyboard, entering characters corresponding to the one or more activated character keys into the text entry area;
detecting a fourth input;
in response to detecting the fourth input, displaying one or more characters that correspond to a romanization corresponding to the sequence of the first character and the characters corresponding to the one or more activated character keys;
while displaying the one or more characters that correspond to the romanization, detecting a fifth input that selects a respective character of the displayed characters that correspond to the romanization; and
in response to detecting the fifth input, entering the selected respective character into the text entry area.

7. The device of claim 1, wherein the candidate characters are Chinese characters, Japanese characters, Korean characters, Vietnamese characters, Hindi characters, or Thai characters.

8. A method, comprising:
at an electronic device with a display and a touch-sensitive keyboard:
displaying a text entry area on the display;
    detecting a first input on the touch-sensitive keyboard, the touch-sensitive keyboard including one or more character keys;
    in accordance with a determination that the first input corresponds to activation of a character key on the touch-sensitive keyboard, entering a first character corresponding to the character key into the text entry area;
    in accordance with a determination that the first input corresponds to a first portion of a character drawn on the touch-sensitive keyboard and in accordance with detecting that the first input starts in a predefined region of the touch-sensitive keyboard that is a smaller subset of area than the entire keyboard area and that includes one or more character keys:
        determining one or more candidate characters for the drawn first portion of the character; and
        displaying a candidate character selection interface on the display, including displaying at least one of the candidate characters in the candidate character selection interface;
    while displaying the candidate character selection interface on the display, detecting a second input that selects a respective candidate character within the candidate character selection interface; and
    in response to detecting the second input, entering the selected respective candidate character into the text entry area.

9. A non-transitory computer readable storage medium storing one or more programs, the one or more programs comprising instructions, which when executed by an electronic device with a display and a touch-sensitive keyboard, cause the device to:
display a text entry area on the display;
    detect a first input on the touch-sensitive keyboard, the touch-sensitive keyboard including one or more character keys;
    in accordance with a determination that the first input corresponds to activation of a character key on the touch-sensitive keyboard, enter a first character corresponding to the character key into the text entry area;
    in accordance with a determination that the first input corresponds to a first portion of a character drawn on the touch-sensitive keyboard and in accordance with detecting that the first input starts in a predefined region of the touch-sensitive keyboard that is a smaller subset of area than the entire keyboard area and that includes one or more character keys:
        determine one or more candidate characters for the drawn first portion of the character; and
        display a candidate character selection interface on the display, including displaying at least one of the candidate characters in the candidate character selection interface;
while displaying the candidate character selection interface on the display, detecting a second input that selects a respective candidate character within the candidate character selection interface; and
in response to detecting the second input, enter the selected respective candidate character into the text entry area.

\* \* \* \* \*